United States Patent [19]

Bretz

[11] Patent Number: 4,615,813

[45] Date of Patent: Oct. 7, 1986

[54] WATER-BASED METAL-CONTAINING ORGANIC PHOSPHATE COMPOSITIONS

[75] Inventor: John Bretz, Parma, Ohio

[73] Assignee: The Lubrizol Corporation, Wickliffe, Ohio

[21] Appl. No.: 812,151

[22] Filed: Dec. 23, 1985

Related U.S. Application Data

[62] Division of Ser. No. 634,919, Jul. 26, 1984, Pat. No. 4,582,543.

[51] Int. Cl.$^4$ .............................................. C09K 7/02
[52] U.S. Cl. .............................. 252/8.514; 252/8.51; 252/8.511
[58] Field of Search ................. 252/49.5, 8.5 A, 8.5 C, 252/8.5 P

[56] References Cited

U.S. PATENT DOCUMENTS

| | | | |
|---|---|---|---|
| 3,214,374 | 10/1965 | Sample | 252/8.5 |
| 3,215,715 | 11/1965 | Wurstner | 260/403 |
| 3,276,916 | 10/1966 | Wurstner | 148/6.16 |
| 3,411,923 | 11/1968 | Bretz | 106/14 |
| 3,716,486 | 2/1973 | Perricone | 252/8.5 |
| 4,064,055 | 12/1977 | Carney | 252/8.5 |
| 4,230,586 | 10/1980 | Bretz | 252/8.5 |

OTHER PUBLICATIONS

Rosenberg et al., "Increased Drill Bit Life Through Use of Extreme Pressure Lubricant Drilling Fluids", AIME Petroleum Transactions, vol. 216, 1959, pp. 195–202.

Alford, "New Technique Evaluates Drilling Mud Lubricants", reprinted from World Oil, Jul. 1976.

*Primary Examiner*—Herbert B. Guynn
*Attorney, Agent, or Firm*—Denis A. Polyn; Walter C. Danison; Karl Bozicevic

[57] ABSTRACT

Water-based metal-containing organic phosphate compositions which are useful as corrosion-inhibiting coating compositions, metal working lubricants and drilling fluids for well-drilling operations are disclosed. These compositions comprise: (A) water or an aqueous drilling mud; (B) an overbased non-Newtonian colloidal disperse system comprising (B)(1) solid metal-containing colloidal particles predispersed in (B)(2) a dispersing medium of at least one inert organic liquid and (B)(3) at least one member selected from the class consisting of organic compounds which are substantially soluble in said dispersing medium, the molecules of said organic compound being characterized by polar substituents and hydrophobic portions; and (C) a metal-containing organic phosphate complex derived from the reaction of (C)(1) at least one polyvalent metal salt of an acid phosphate ester, said acid phosphate ester being derived from the reaction of phosphorus pentoxide or phorphoric acid with a mixture of at least one monohydric alcohol and at least one polyhydric alcohol, with (C)(2) at least one organic epoxide. These compositions preferably include an effective amount of (D) an alkali or an alkaline earth metal salt of an organic acid, (E) a carboxylic acid and (F) an N-(hydroxyl-substituted hydrocarbyl) amine to enhance the dispersion of components (B) and (C) with said water or drilling mud (A).

18 Claims, No Drawings

WATER-BASED METAL-CONTAINING ORGANIC PHOSPHATE COMPOSITIONS

This is a division of application Ser. No. 634,919, filed July 26, 1984, now U.S. Pat. No. 4,582,543.

TECHNICAL FIELD

This invention relates to water-based metal-containing organic phosphate compositions which are useful as corrosion-inhibiting coatings, metal working lubricants and drilling fluids for well-drilling operations. These compositions comprise water, an overbased non-Newtonian colloidal disperse system and a metal-containing organic phosphate complex. These compositions also preferably containing an effective amount of at least one alkali or alkaline earth metal salt of an organic acid, at least one carboxylic acid and at least one N-(hydroxyl-substituted hydrocarbyl) amine to enhance the dispersion of the non-Newtonian colloidal disperse system and metal-containing organic phosphate complex with the water.

BACKGROUND OF THE INVENTION

The corrosion of metal articles is of obvious economic significance in any industrial application and, as a consequence, the inhibition of such corrosion is a matter of prime consideration. It is particularly significant to users of steel and other ferrous alloys. The corrosion of such ferrous metal alloys is largely a matter of rust formation, which in turn involves the overall conversion of the free metal to its oxides.

The theory which best explains such oxidation of ferrous metal articles postulates the essential presence of both water and oxygen. Even minute traces of moisture are sufficient, according to this theory, to induce dissolution of iron therein and the formation of ferrous hydroxide until the water becomes saturated with ferrous ions. The presence of oxygen causes oxidation of the resulting ferrous hydroxide to ferric hydroxide, which settles out of solution and is ultimately converted to ferric oxide or rust.

The above sequence of reactions can be prevented, or at least in large measure inhibited, by relatively impermeable coatings which have the effect of excluding moisture and/or oxygen from contact with the metal surface. It is important, therefore, that these coatings adhere tightly to the metal surface and resist flaking, crazing, blistering, powdering, and other forms of loss of adhesion. A satisfactory corrosion-proofing coating, therefore, must have the ability to resist weathering, high hummidity, and corrosive atmospheres such as salt-laden mist or fog, air contaminated with industrial waste, etc., so that a uniform protective film is maintained on all or most of the metal surface.

U.S. Pat. Nos. 3,215,715 and 3,276,916 disclose metal-containing phosphate complexes for inhibiting the corrosion of metal. These complexes are prepared by the reaction of (A) a polyvalent metal salt of the acid phosphate esters derived from the reaction of phosphorus pentoxide with a mixture of a monohydric alcohol and from 0.25 to 4.0 equivalents of a polyhydric alcohol, with (B) at least about 0.1 equivalent of an organic epoxide.

U.S. Pat. No. 3,411,923 discloses metal-containing organic phosphate compositions for inhibiting the corrosion of metals which comprise (A) a metal-containing organic phosphate complex prepared by the process which comprises the reaction of (I) a polyvalent metal salt of an acid phosphate ester derived from the reaction of phosphorus pentoxide or phosphoric acid with a mixture of a monohydric alcohol and from about 0.25 to about 4.0 equivalents of a polyhydric alcohol with (II) at least about 0.1 equivalent of an organic epoxide, and (B) a basic alkali or alkaline earth metal salt of a sulfonic or carboxylic acid having at least about 12 aliphatic carbon atoms, said salt having a metal ratio of at least about 1.1.

The foregoing corrosion-inhibiting compositions are oil-based compositions. That is, they are usually diluted with mineral oil or volatile diluents such as benzene, xylene, aromatic petroleum spirits, turpentine, etc. It would be advantageous to replace these oil-based compositions with water-based compositions wherever possible.

Metal working operations, for example, rolling, forging, hot-pressing, blanking, bending, stamping, drawing, cutting, punching, spinning and the like generally employ a lubricant to facilitate the same. Lubricants greatly improve these operations in that they can reduce the power required for the operation, prevent sticking and decrease wear of dies, cutting bits and the like. In addition, they frequently provide rust inhibiting properties to the metal being treated. These lubricants are usually oil-based and it would be advantageous to replace such oil-based lubricants with water-based lubricants wherever possible.

The use of drilling fluids in well-drilling operations has been known for at least 100 years. See, for example, the discussion in Kirk-Othmer, "Encyclopedia of Chemical Technology", Second Edition, Vol. 7, pages 287 et seq. Aqueous drilling fluids or muds usually contain a thickening agent such as clay and often a density-increasing agent such as barites. The use of other additives in drilling fluids or muds is also known. See, for example, John McDermott, "Drilling Mud and Fluid Additives", Noyes-Data Corporation, New Jersey, 1973.

Among the types of additives used in drilling muds or fluids are lubricants or lubricity agents. Such additives reduce drag on the drill string and bit and thereby reduce the possibilities of twist off, reduce trip time, lessen differential sticking and lower the amount of energy required to turn the rig (that is, the torque requirements). Methods for evaluating such drilling fluid lubricants are also known. See, for example, the article by Stan E. Alford in "World Oil", July, 1976, Gulf Publishing Company.

Other additives which enhance the lubricating properties of drilling fluids or muds have been reported in the patent literature. See, for example, U.S. Pat. Nos. 3,214,374 and 4,064,055. The use of petroleum sulfonates as extreme pressure additives in oil emulsion and aqueous drilling fluids is also known. See the articcle by M. Rosenberg et al in AIME Petroleum Transactions, Vol. 216 (1959), pages 195–202 and U.S. Pat. No. 4,064,056.

U.S. Pat. No. 4,230,586 discloses aqueous well-drilling fluids which comprise (A) at least one non-Newtonian colloidal disperse system comprising:

(1) solid metal-containing colloidal particles at least a portion of which are predispersed in (2) at least one liquid dispersing medium; and (3) as an essential component, at least one organic compound which is soluble in said dispersing medium, the molecules of said organic compound being characterized by a hydrophobic portion and at least one polar substituent
and (B) at least one emulsifier.

Despite the foregoing, the search for effective drilling fluids, which aid in achieving more efficient and economical rotary drilling operations, has continued.

SUMMARY OF THE INVENTION

The present invention contemplates the provision of water-based metal-containing organic phosphate compositions which are useful as corrosion-inhibiting coating compositions, metal working lubricants and drilling fluids for well-drilling operations.

Broadly stated, the present invention provides for a composition comprising: (A) water; (B) an overbased non-Newtonian colloidal disperse system comprising (B)(1) solid metal-containing colloidal particles predispersed in (B)(2) a dispersing medium of at least one inert organic liquid and (B)(3) at least one member selected from the class consisting of organic compounds which are substantially soluble in said dispersing medium, the molecules of said organic compound being characterized by polar substituents and hydrophobic portions; and (C) a metal-containing organic phosphate complex derived from the reaction of (C)(1) at least one polyvalent metal salt of an acid phosphate ester, said acid phosphate ester being derived from the reaction of phosphorus pentoxide or phosphoric acid with a mixture of at least one monohydric alcohol and at least one polyhydric alcohol, with (C)(2) at least one organic epoxide; components (B) and (C) being dispersed with said water.

In a preferred embodiment, the present invention provides for a drilling fluid comprising (A) a major amount of an aqueous drilling mud, and a minor torque reducing amount of a mixture of: (B) an overbased non-Newtonian colloidal disperse system comprising (B)(1) solid metal-containing colloidal particles predispersed in (B)(2) a dispersing medium of at least one inert organic liquid and (B)(3) at least one member selected from the class consisting of organic compounds which are substantially soluble in said dispersing medium, the molecules of said organic compound being characterized by polar substituents and hydrophobic portions; and (C) a metal-containing organic phosphate complex derived from the reaction of (C)(1) at least one polyvalent metal salt of an acid phosphate ester, said acid phosphate ester being derived from the reaction of phosphrous pentoxide or phosphoric acid with a mixture of a monohydric alcohol and a polyhydric alcohol, with (C)(2) at least one organic epoxide.

The foregoing compositions and drilling fluids preferably include an effective amount of (D) an alkali or an alkaline earth metal salt of an organic acid, (E) a carboxylic acid and (F) an N-(hydroxyl-substituted hydrocarbyl) amine to enhance the dispersion of components (B) and (C) with said water or drilling mud (A).

DETAILED DESCRIPTION OF THE PREFERRED EMBODIMENT

The Water or Drilling Mud (A)

When the compositions of the present invention are to be employed as corrosion-inhibiting coating compositions or metal working lubricants, component (A) is water.

When the compositions of the present invention are in the form of a drilling fluid, component (A) is an aqueous drilling mud. These drilling muds are usually suspensions of solids in water; these solids form the bulk of the mud filter cake. In general, the solids are clays and barite and their relative amounts present in the bulk mud are controlled within limits set by the required mud density. The drilling muds contemplated herein are entirely conventional and well known to those skilled in the art. Reference is made to John McDermott, "Drilling Mud and Fluid Additives", Noyes-Data Corporation, New Jersey, 1973, which is incorporated herein by reference.

The Overbased Non-Newtonian Disperse System (B)

The terminology "disperse system" as used in the specification and claims is a term of art generic to colloids or colloidal solutions, e.g., "any homogeneous medium containing dispersed entities of any size and state", Jirgensons and Straumanis, "A Short Textbook on Colloidal Chemistry" (2nd Ed.) The MacMillan Co., New York, 1962 at page 1. However, the particular disperse systems of the present invention form a subgenus within this broad class of disperse system, this subgenus being characterized by several important features.

So long as the solid particles remain dispersed in the dispersing medium as colloidal particles the particle size is not critical. Ordinarily, the particles will not exceed 5000 A. However, it is preferred that the maximum unit particle size be less than about 1000 A. In a particularly preferred aspect of the invention, the unit particle size is less than about 400 A. Systems having a unit particle size in the range of 30 A to 200 A are useful. The minimum unit particle size is at least 20 A and preferably at least about 30 A.

The language "unit particle size" is intended to designate the average particle size of the solid, metal-containing particles assuming maximum dispersion of the individual particles throughout the disperse medium. That is, the unit particle is that particle which corresponds in size to the average size of the metal-containing particles and is capable of independent existence within the disperse system as a discrete colloidal particle. These metal-containing particles are found in two forms in the disperse systems. Individual unit particles can be dispersed as such throughout the medium or unit particles can form an agglomerate, in combination with other materials (e.g., another metal-containing particle, the disperse medium, etc.) which are present in the disperse systems. These agglomerates are dispersed through the system as "metal-containing particles". Obviously, the "particle size" of the agglomerate is substantially greater than the unit particle size. Furthermore, it is equally apparent that this agglomerate size is subject to wide variations, even within the same disperse system. The agglomerate size varies, for example, with the degree of shearing action employed in dispersing the unit particles. That is, mechanical agitation of the disperse system tends to break down the agglomerates into the individual components thereof and disperse these individual components throughout the disperse medium. The ultimate in dispersion is achieved when each solid, metal-containing particle is individually dispersed in the medium. Accordingly, the disperse systems are characterized with reference to the unit particle size, it being apparent to those skilled in the art that the unit particle size represents the average size of solid, metal-containing particles present in the system which can exist independently. The average particle size of the metal-containing solid particles in the system can be made to approach the unit particle size value by the application of a shearing action to the existent system or during the formation of the disperse system as the particles are being formed in situ. It is not necessary that maximum particle dispersion exist to have useful disperse systems. The agitation associated with homogenization of the overbased material and conversion agent produces sufficient particle dispersion.

Basically, the solid metal-containing particles are in the form of metal salts of inorganic acids, and low molecular weight organic acids, hydrates thereof, or mixtures of these. These salts are usually the alkali and alkaline earth metal formates, acetates, carbonates, hydrogen carbonates, hydrogen sulfides, sulfites, hydrogen sulfites, and halides, particularly chlorides. In other words, the metal-containing particles are ordinarily particles of metal salts, the unit particle is the individual salt particle and the unit particle size is the average particle size of the salt particles which is readily ascertained, as for example, by conventional X-ray diffraction techniques. Colloidal disperse systems possessing particles of this type are sometimes referred to as macromolecular colloidal systems.

Because of the composition of the colloidal disperse systems of this invention, the metal containing particles also exist as components in micellar colloidal particles. In addition to the solid metal-containing particles and the disperse medium, the colloidal disperse systems of the invetion are characterized by a third essential component, one which is soluble in the medium and contains in the molecules thereof a hydrophobic portion and at least one polar substituent. This third component can orient itself along the external surfaces of the above metal salts, the polar groups lying along the surface of these salts with the hydrophobic portions extending from the salts into the disperse medium forming micellar colloidal particles. These micellar colloids are formed through weak intermolecular forces, e.g., Van der Waals forces, etc. Micellar colloids represent a type of agglomerate particle as discussed hereinabove. Because of the molecular orientation in these micellar colloidal particles, such particles are characterized by a metal-containing layer (i.e., the solid metal-containing particles and any metal present in the polar substituent of the third component, such as the metal in a sulfonic or carboxylic acid salt group), a hydrophobic layer formed by the hydrophobic portions of the molecules of the third component and a polar layer bridging said metal-containing layer and said hydrophobic layer, said polar bridging layer comprising the polar substituents of the third component of the system, e.g., the

group if the third component is an alkaline earth metal petrosulfonate.

The second essential component of the colloidal disperse system is the dispersing medium. The identity of the medium is not a particularly critical aspect of the invention as the medium primarily serves as the liquid vehicle in which solid particles are dispersed. The medium can have components characterized by relatively low boiling points, e.g., in the range of 25° C. to 120° C. to facilitate subsequent removal of a portion or substantially all of the medium from the aqueous compositions or drilling fluids of the invention or the components can have a higher boiling point to protect against removal from such compositions or drilling fluids upon standing or heating. There is no criticality in an upper boiling point limitation on these liquids.

Representative liquids include mineral oils, the alkanes and haloalkanes of 5 to 18 carbon atoms, polyhalo- and perhaloalkanes of up to about 6 carbons, the cycloalkanes of 5 or more carbons, the corresponding alkyl- and/or halo-substituted cycloalkanes, the aryl hydrocarbons, the alkylaryl hydrocarbons, the haloaryl hydrocarbons, ethers such as dialkyl ethers, alkyl aryl ethers, cycloalkyl ethers, cycloalkylalkyl ethers, alkanols, alkylene glycols, polyalkylene glycols, alkyl ethers of alkylene glycols and polyalkylene glycols, dibasic alkanoic acid diesters, silicate esters, and mixtures of these. Specific examples include petroleum ether, Stoddard Solvent, pentane, hexane, octane, isooctane, undecane, tetradecane, cyclopentane, cyclohexane, isopropylcyclohexane, 1,4-dimethylcyclohexane, cyclooctane, benzene, toluene, xylene, ethyl benzene, tert-butylbenzene, halobenzenes especially mono- and polychlorobenzenes such as chlorobenzene per se and 3,4-dichlorotoluene, mineral oils, n-propylether, isopropylether, isobutylether, n-amylether, methyl-n-amylether, cyclohexylether, ethoxycyclohexane, methoxybenzene, isopropoxy benzene, p-methoxy-toluene, methanol, ethanol, propanol, isopropanol, hexanol, n-octyl alcohol, n-decyl alcohol, alkylene glycols such as ethylene glycol and propylene glycol, diethyl ketone, dipropyl ketone, methylbutyl ketone, acetophenone, 1,2-difluoro tetrachloroethane, dichlorofluoromethane, 1,2-dibromotetrafluoroethane, trichlorofluoromethane, 1-chloropentane, 1,3-dichlorohexane, formamide, dimethylformamide, acetamide, dimethylacetamide, diethylacetamide, propionamide, diisooctyl azelate, ethylene glycol, polypropylene glycols, hexa-2-ethylbutoxy disiloxane, etc.

Also useful as dispersing medium are the low molecular weight, liquid polymers, generally classified as oligomers, which include the dimers, tetramers, pentamers, etc. Illustrative of this large class of materials are such liquids as the propylene tetramers, isobutylene dimers, and the like.

From the standpoint of availability, cost, and performance, the alkyl, cycloalkyl, and aryl hydrocarbons represent a preferred class of disperse mediums. Liquid petroleum fractions represent another preferred class of disperse mediums. Included within these preferred classes are benzenes and alkylated benzenes, cycloalkanes and alkylated cycloalkanes, cycloalkenes and alkylated cycloalkenes such as found in naphthene-based petroleum fractions, and the alkanes such as found in the paraffin-based petroleum fractions. Petroleum ether, naphthas, mineral oils, Stoddard Solvent, toluene, xylene, etc., and mixtures thereof are examples of economical sources of suitable inert organic liquids which can function as the disperse medium in the colloidal disperse systems of the present invention. Mineral oil can serve by itself as the disperse medium.

Preferred disperse systems include those containing at least some mineral oil as component of the disperse medium. Any amount of mineral oil is beneficial in this respect. However, in this preferred class of systems, it is desirable that mineral oil comprise at least about 1% by weight of the total medium, and preferably at least about 5% by weight. Those mediums comprising at least 10% by weight mineral oil are especially useful. Mineral oil can serve as the exclusive disperse medium.

In addition to the solid, metal-containing particles and the disperse medium, the disperse systems employed herein require a third essential component. This third component is an organic compound which is soluble in the disperse medium, and the molecules of which are characterized by a hydrophobic portion and at least one polar substituent. As explained, infra, the organic compounds suitable as a third component are extremely diverse. These compounds are inherent constituents of the disperse systems as a result of the methods used in preparing the systems. Further characteristics of the components are apparent from the following discussion of methods for preparing the colloidal disperse systems.

Preparation of the Overbased Non-Newtonian Disperse System (B)

Broadly speaking, the colloidal disperse systems of the invention are prepared by treating a single phase homogeneous, Newtonian system of an "overbased", "superbased", or "hyperbased", organic compound with a conversion agent, usually an active hydrogen containing compound, the treating operation being simply a thorough mixing together of the two components, i.e., homogenization. This treatment converts these single phase systems into the non-Newtonian colloidal disperse systems utilized in the compositions of the present invention.

The terms "overbased", "superbased", and "hyperbased", are terms of art which are generic to well known classes of metal-containing materials. These overbased materials have also been referred to as "complexes", "metal complexes", "high-metal containing salts", and the like. Overbased materials are characterized by a metal content in excess of that which would be present according to the stoichiometry of the metal and the particular organic compound reacted with the metal, e.g., a carboxylic or sulfonic acid. Thus, if a monosulfonic acid,

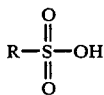

is neutralized with a basic metal compound, e.g., calcium hydroxide, the "normal" metal salt produced will contain one equivalent of calcium for each equivalent of acid, i.e.,

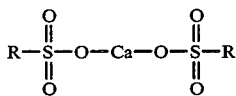

However, as is well known in the art, various processes are available which result in an inert organic liquid solution of a product containing more than the stoichiometric amount of metal. The solutions of these products are referred to herein as overbased materials. Following these procedures, the sulfonic acid or an alkali or alkaline earth metal salt thereof can be reacted with a metal base and the product will contain an amount of metal in excess of that necessary to neutralize the acid, for example, 4.5 times as much metal as present in the normal salt or a metal excess of 3.5 equivalents. The actual stoichiometric excess of metal can vary considerably, for example, from about 0.1 equivalent to about 30 or more equivalents depending on the reactions, the process conditions, and the like. These overbased materials useful in preparing the disperse systems usually contain from about 3.5 to about 30 or more equivalents of metal for each equivalent of material which is overbased.

In the present specification and claims the term "overbased" is used to designate materials containing a stoichiometric excess of metal and is, therefore, inclusive of those materials which have been referred to in the art as overbased, superbased, hyperbased, etc., as discussed supra.

The terminology "metal ratio" is used in the prior art and herein to designate the ratio of the total chemical equivalents of the metal in the overbased material (e.g., a metal sulfonate or carboxylate) to the chemical equivalents of the metal in the product which would be expected to result in the reaction between the organic material to be overbased (e.g., sulfonic or carboxylic acid) and the metal-containing reactant (e.g., calcium hydroxide, barium oxide, etc.) according to the known chemical reactivity and stoichiometry of the two reactants. Thus, in the normal calcium sulfonate discussed above, the metal ratio is one, and in the overbased sulfonate, the metal ratio is 4.5. Obviously, if there is present in the material to be overbased more than one compound capable of reacting with the metal, the "metal ratio" of the product will depend upon whether the number of equivalents of metal in the overbased product is compared to the number of equivalents expected to be present for a given single component or a combination of all such components.

The overbased materials are prepared by treating a reaction mixture comprising the organic material to be overbased, a reaction medium consisting essentially of at least one inert, organic solvent for said organic material, a stoichiometric excess of a metal base, and a promoter with an acidic material. The methods for preparing the overbased materials as well as an extremely diverse group of overbased materials are well known in the prior art and are disclosed for example in the following U.S. Pat. Nos.: 2,616,904; 2,616,905; 2,616,906; 2,616,911; 2,616,924; 2,616,925; 2,617,049; 2,695,910; 2,723,234; 2,723,235; 2,723,236; 2,760,970; 2,767,164; 2,767,209; 2,777,874; 2,798,852; 2,839,470; 2,856,359; 2,859,360; 2,856,361; 2,861,951; 2,883,340; 2,915,517; 2,959,551; 2,968,642; 2,971,014; 2,989,463; 3,001,981; 3,027,325; 3,070,581; 3,108,960; 3,133,019; 3,146,201; 3,147,232; 3,152,991; 3,155,616; 3,170,880; 3,170,881; 3,172,855; 3,194,823; 3,223,630; 3,232,883; 3,242,079; 3,242,080; 3,250,710; 3,256,186; 3,274,135; 3,492,231; 4,230,586; 4,436,855; and 4,443,577. These patents disclose processes, materials which can be overbased, suitable metal bases, promoters, and acidic materials, as well as a variety of specific overbased products useful in producing the disperse systems of this invention. These patents are incorporated herein by reference.

An important characteristic of the organic materials which are overbased is their solubility in the particular reaction medium utilized in the overbasing process. As the reaction medium used previously has normally comprised petroleum fractions, particularly mineral oils, these organic materials have generally been oil-soluble. However, if another reaction medium is employed (e.g., aromatic hydrocarbons, aliphatic hydrocarbons, kerosene, etc.) it is not esential that the organic materials be soluble in mineral oil as long as it is soluble in the given reaction medium. Obviously, many organic materials which are soluble in mineral oils will be soluble in many of the other indicated suitable reaction mediums. It should be apparent that the reaction medium usually becomes the disperse medium of the colloidal disperse system or at least a component thereof depending on whether or not additional inert organic liquid is added as part of the reaction medium or the disperse medium.

Materials which can be overbased are generally oil-soluble organic acids including phosphorus acids, thiophosphorus acids, sulfur acids, carboxylic acids, thiocarboxylic acids, and the like, as well as the corresponding alkali and alkaline earth metal salts thereof. U.S. Pat. No. 2,777,874 discloses organic acids suitable for preparing overbased materials which can be converted to disperse systems for use in the compositions of the invention. Similarly, U.S. Pat. Nos. 2,616,904; 2,695,910; 2,767,164; 2,767,209; 3,147,232; and 3,274,135 disclose a variety of organic acids suitable for preparing overbased materials as well as representative examples of overbased products prepared from such acids. Overbased acids wherein the acid is a phosphorus acid, a thiophosphorus acid, phosphorus acid-sulfur acid combination, and sulfur acid prepared from polyolefins are disclosed in U.S. Pat. Nos. 2,883,340; 2,915,517; 3,001,981; 3,108,960; and 3,232,883. Overbased phenates are disclosed in U.S. Pat. No. 2,959,551 while overbased ketones are found in U.S. Pat. No. 2,798,852. A variety of overbased materials derived from oil-soluble metal-free, non-tautomeric neutral and basic organic polar compounds such as esters, amines, amides, alcohols, ethers, sulfides, sulfoxides, and the like are disclosed in U.S. Pat. Nos. 2,968,642; 2,971,014; and 2,989,463. Another class of materials which can be overbased are the oil-soluble, nitro-substituted aliphatic hydrocarbons, particularly nitro-substituted polyolefins such as polyethylene, polypropylene, polyisobutylene, etc. Materials of this type are illustrated in U.S. Pat. No. 2,959,551. Likewise, the oil-soluble reaction product of alkylene polyamines such as propylene diamine or N-alkylated propylene diamine with formaldehyde or formaldehyde producing compound (e.g., paraformaldehyde) can be overbased. Other compounds suitable for overbasing are disclosed in the above-cited patents or are otherwise well known in the art.

The organic liquids used as the disperse medium in the colloidal disperse system can be used as solvents for the overbasing process.

The metal compounds used in preparing the overbased materials are normally the basic salts of metals in Group I-A and Group II-A of the Periodic Table although other metals such as lead, zinc, manganese, etc., can be used in the preparation of overbased materials. The anionic portion of the salt can be hydroxyl, oxide, carbonate, hydrogen carbonate, nitrate, sulfite, hydrogen sulfite, halide, amide, sulfate etc., as disclosed in the above-cited patents. Preferred overbased materials are prepared from the alkaline earth metal oxides, hydroxides, and alcoholates such as the alkaline earth metal lower alkoxides.

The promoters, that is, the materals which permit the incorporation of the excess metal into the overbased material, are also quite diverse and well known in the art as evidenced by the above-cited patents. A particularly comprehensive discussion of suitable promoters is found in U.S. Pat. Nos. 2,777,874; 2,695,910; and 2,616,904. These include the alcoholic and phenolic promoters which are preferred. The alcoholic promoters include the alkanols of 1 to about 12 carbon atoms such as methanol, ethanol, amyl alcohol, octanol, isopropanol, and mixtures of these and the like. Phenolic promoters include a variety of hydroxy-substituted benzenes and naphthalenes. A particularly useful class of phenols are the alkylated phenols of the type listed in U.S. Pat. No. 2,777,874, e.g., heptylphenols, octylphenols, and nonylphenols. Mixtures of various promoters are sometimes used.

Suitable acidic materials are also disclosed in the above-cited patents, for example, U.S. Pat. No. 2,616,904. Included within the known group of useful acidic materials are liquid acids such as formic acid, acetic acid, nitric acid, sulfuric acid, hydrochloric acid, hydrobromic acid, carbamic acid, substituted carbamic acids, etc. Acetic acid is a very useful acidic material although inorganic acidic materials such as HCl, $SO_2$, $SO_3$, $CO_2$, $H_2S$, $N_2O_3$, etc., are ordinarily employed as the acidic materials. Preferred acidic materials are carbon dioxide and acetic acid.

In preparing overbased materials, the material to be overbased, an inert non-polar organic solvent therefor, the metal base, the promoter and the acidic material are brought together and a chemical reaction ensues. The exact nature of the resulting overbased product is not known. However, it can be adequately described for purposes of the present specification as a single phase homogeneous mixture of the solvent and (1) either a metal complex formed from the metal base, the acidic material, and the material being overbased and/or (2) an amorphous metal salt formed from the reaction of the acidic material with the metal base and the material which is said to be overbased. Thus, if mineral oil is used as the reaction medium, petrosulfonic acid as the material which is overbased, $Ca(OH)_2$ as the metal base, and carbon dioxide as the acidic material, the resulting overbased material can be described for purposes of this invention as an oil solution of either a metal containing complex of the acidic material, the metal base, and the petrosulfonic acid or as an oil solution of amorphous calcium carbonate and calcium petrolsulfonate.

The temperature at which the acidic material is contacted with the remainder of the reaction mass depends to a large measure upon the promoting agent used. With a phenolic promoter, the temperature usually ranges from about 80° C. to 300° C., and preferably from about 100° C. to about 200° C. When an alcohol or mercaptan is used as the promoting agent, the temperature usually will not exceed the reflux temperature of the reaction mixture and preferably will not exceed about 100° C.

In view of the foregoing, it should be apparent that the overbased materials may retain all or a portion of the promoter. That is, if the promoter is not volatile (e.g., an alkyl phenol) or otherwise readily removable from the overbased material, at least some promoter remains in the overbased product. Accordingly, the disperse systems made from such products may also contain the promoter. The presence or absence of the promoter in the overbased material used to prepare the disperse system and likewise, the presence or absence of the promoter in the colloidal disperse systems themselves does not represent a critical aspect of the invention. Obviously, it is within the skill of the art to select a volatile promoter such as a lower alkanol, e.g., methanol, ethanol, etc., so that the promoter can be readily removed prior to incorporation with the compositions or drilling fluids of the present invention.

A preferred class of overbased materials used as starting materials in the preparation of the disperse systems of the present invention are the alkaline earth metal-overbased oil-soluble organic acids, preferably those containing at least 12 aliphatic carbons although the acids may contain as few as 8 aliphatic carbons if the acid molecule includes an aromatic ring such as phenol, naphthyl, etc. Representative organic acids suitable for preparing these overbased materials are discussed and identified in detail in the above-cited patents. Particularly U.S. Pat. Nos. 2,616,904 and 2,777,874 disclose a variety of suitable organic acids. Overbased oil-soluble carboxylic and sulfonic acids are particularly suitable. Illustrative of the carboxylic acids are palmitic acid, stearic acid, myristic acid, oleic acid, linoleic acid, behenic acid, hexatriacontanoic acid, tetrapropylene-substituted glutaric acid, polyisobutene (M.W.-5000)-substituted succinic acid, polypropylene, (M.W.-10,000)-substituted succinic acid, octadecyl-substituted adipic acid, chlorostearic acid, 9-methylstearic acid, dichlorostearic acid, stearylbenzoic acid, eicosane-substituted naphthoic acid, dilauryldecahydronaphthalene carboxylic acid, didodecyltetralin carboxylic acid, dioctylcyclohexane carboxylic acid, mixtures of these acids, their alkali and alkaline earth metal salts, and/or their anhydrides. Of the oil-soluble sulfonic acids, the mono-, di-, and tri-aliphatic hydrocarbon substituted aryl sulfonic acids and the petroleum sulfonic acids (petrolsulfonic acids) are particularly preferred. Illustrative examples of suitable sulfonic acids include mahogany sulfonic acids, petrolatum sulfonic acids, monoeicosane-substituted naphthalene sulfonic acids dodecylbenzene sulfonic acids, didodecylbenzene sulfonic acids, dinonylbenzene sulfonic acids, cetylchlorobenzene sulfonic acids, dilauryl beta-naphthalene sulfonic acids, the sulfonic acid derived by the treatment of polyisobutene having a molecular weight of 1500 with chlorosulfonic acid, nitronaphthalene sulfonic acid, paraffin wax sulfonic acid, cetylcyclopentane sulfonic acid, laurylcyclohexanesulfonic acids, polyethylene (M.W.-750) sulfonic acids, etc. Obviously, it is necessary that the size the number of aliphatic groups on the aryl sulfonic acids be sufficient to render the acids soluble. Normally the aliphatic groups will be alkyl and/or alkenyl groups such that the total number of aliphatic carbons is at least 12.

Within this preferred group of overbased carboxylic and sulfonic acids, the barium, and calcium overbased mono-, di-, and tri-alkylated benzene and naphthalene (including hydrogenated forms thereof), petrosulfonic acids, and higher fatty acids are especially preferred. Illustrative of the synthetically produced alkylated benzene and naphthalene sulfonic acids are those containing alkyl substituents having from 8 to about 30 carbon atoms therein. Such acids include di-isododecyl-benzene sulfonic acid, wax-substituted phenol sulfonic acid, wax-substituted benzene sulfonic acids, polybutene-substituted sulfonic acid, cetyl-chlorobenzene sulfonic acid, di-cetylnaphthalene sulfonic acid, di-lauryldiphenylether sulfonic acid, di-isononylbenzene sulfonic acid, di-isooctadecylbenzene sulfonic acid, stearylnaphthalene sulfonic acid, and the like. The petroleum sulfonic acids are a well known art recognized class of materials which have been used as starting materials in preparing overbased products since the inception of overbasing techniques as illustrated by the above patents. Petroleum sulfonic acids are obtained by treating refined or semi-refined petroleum oils with concentrated or fuming sulfuric acid. These acids remain in the oil after the settling out of sludges. These petroleum sulfonic acids, depending on the nature of the petroleum oils from which they are prepared, are oil-soluble alkane sulfonic acids, alkyl-substituted cycloaliphatic sulfonic acids including cycloalkyl sulfonic acids and cycloalkene sulfonic acids, and alkyl, alkaryl, or aralkyl substituted hydrocarbon aromatic sulfonic acids including single and condensed aromatic nuclei as well as partially hydrogenated forms thereof. Examples of such petrosulfonic acids include mahogany sulfonic acid, white oil sulfonic acid, petrolatum sulfonic acid, petroleum naphthene sulfonic acid, etc. This preferred group of aliphatic fatty acids includes the saturated and unsaturated higher fatty acids containing from about 12 to about 30 carbon atoms. Illustrative of these acids are lauric acid, palmitic acid, oleic acid, linoleic acid, linoleic acid, oleostearic acid, stearic acid, myristic acid, and undecalinic acid, alphachlorostearic acid, and alpha-nitrolauric acid.

As shown by the representative examples of the preferred classes of sulfonic and carboxylic acids, the acids may contain non-hydrocarbon substituents such as halo, nitro, alkoxy, hydroxyl, and the like.

It is desirable that the overbased materials used to prepare the disperse system have a metal ratio of at least about 3.5 and preferably at least about 4.5. An especially suitable group of the preferred sulfonic acid overbased materials has a metal ratio of at least about 7. While overbased materials having metal ratios as high as 75 have been prepared and can be used, normally the maximum metal ratio will not exceed about 30 and, in most cases, not more than about 20.

The overbased materials used in preparing the disperse systems utilized in the compositions and drilling fluids of the present invention usually contain from about 10% to about 70% by weight of metal-containing components. As explained hereafter, the exact nature of these metal-containing components is not known. While not wishing to be bound by theory, it is believed that the metal base, the acidic material, and the organic material being overbased form a metal complex, this complex being the metal-containing component of the overbased material. On the other hand, it has also been postulated that the metal base and the acidic material form amorphous metal compounds which are dissolved in the inert organic reaction medium and the material which is said to be overbased. The material which is overbased may itself be a metal-containing compound, e.g., a carboxylic or sulfonic acid metal salt. In such a case, the metal containing components of the overbased material would be both the amorphous compounds and the acid salt. The remainder of the overbased materials consist essentially of the inert organic reaction medium and any promoter which is not removed from the overbased product. For purposes of this patent application, the organic material which is subjected to overbasing is considered a part of the metal-containing components. Normally, the liquid reaction medium constitutes at least about 30% by weight of the reaction mixture utilized to prepare the overbased materials.

As mentioned above, the colloidal disperse systems used in the composition of the present invention are prepared by homogenizing a "conversion agent" and the overbased starting material. Homogenization is achieved by vigorous agitation of the two components, preferably at the reflux temperature or a temperature slightly below the reflux temperature. The reflux temperature normally will depend upon the boiling point of the conversion agent. However, homogenization may be achieved within the range of about 25° C. to about 200° C. or slightly higher. Usually, there is no real advantage in exceeding about 150° C.

The concentration of the conversion agent necessary to achieve conversion of the overbased material is usually within the range of from about 1% to about 80% based upon the weight of the overbased material excluding the weight of the inert organic solvent and any promoter present therein. Preferably at least about 10% and usually less than about 60% by weight of the conversion agent is employed. Concentrations beyond 60% appear to afford no additional advantages.

The terminology "conversion agent" as used herein is intended to describe a class of very diverse materials which possess the property of being able to convert the Newtonian homogeneous, single-phase, overbased materials into non-Newtonian colloidal disperse systems. The mechanism by which conversion is accomplished is not completely understood. However, with the exception of carbon dioxide, these conversion agents all possess active hydrogens. The conversion agents include lower aliphatic carboxylic acids, water, aliphatic alcohols, cycloaliphatic alcohols, arylaliphatic alcohols, phenols, ketones, aldehydes, amines, boron acids, phosphorus acids, and carbon dioxide. Mixtures of two or more of these conversion agents are also useful. Particularly useful conversion agents are discussed below.

The lower aliphatic carboxylic acids are those containing less than about 8 carbon atoms in the molecule. Examples of this class of acids are formic acid, acetic acid, propionic acid, butyric acid, valeric acid, isovaleric acid, isobutyric acid, caprylic acid, heptanoic acid, chloroacetic acid, dichloroacetic acid, trichloroacetic acid, etc. Formic acid, acetic acid, and propionic acid, are preferred with acetic acid being especially suitable. It is to be understood that the anhydrides of these acids are also useful and, for the purposes of the specification and claims of this invention, the term acid is intended to include both the acid per se and the anhydride of the acid.

Useful alcohols include aliphatic, cycloaliphatic, and arylaliphatic mono- and polyhydroxy alcohols. Alcohols having less than about 12 carbons are especialy useful while the lower alkanols, i.e., alkanols having less than about 8 carbon atoms are preferred for reasons of economy and effectiveness in the process. Illustrative are the alkanols such as methanol, ethanol, isopropanol, n-propanol, isobutanol, tertiary butanol, isooctanol, dodecanol, n-pentanol, etc.; cycloalkyl alcohols exemplified by cyclopenthol, cyclohexanol, 4-methylcyclohexanol, 2-cyclohexylethanol, cyclopentylmethanol, etc.; phenyl aliphatic alkanols such as benzyl alcohol, 2-phenylethanol, and cinnamyl alcohol; alkylene glycols of up to about 6 carbon atoms and mono-lower alkyl ethers thereof such as monomethylether of ethylene glycol, diethylene glycol, ethylene glycol, trimethylene glycol, hexamethylene glycol, triethylene glycol, 1,4-butanediol, 1,4-cyclohexanediol, glycerol, and pentaerythritol.

The use of a mixture of water and one or more of the alcohols is especially effective for converting the overbased material to colloidal disperse systems. Such combinations often reduce the length of time required for the process. Any water-alcohol combination is effective but a very effective combination is a mixture of one or more alcohols and water in a weight ratio of alcohol to water of from about 0.05:1 to about 24:1. Preferably, at least one lower alkanol is present in the alcohol component of these water-alkanol mixtures. Water-alkanol mixtures wherein the alcoholic portion is one or more lower alkanols are especially suitable.

Phenols suitable for use as conversion agents include phenol, naphthol, ortho-cresol, para-cresol, catechol, mixtures of cresol, para-tert-butylphenol, and other lower alkyl substituted phenols, meta-polyisobutene (M.W.-350)-substituted phenol, and the like.

Other useful conversion agents include lower aliphatic aldehydes and ketones, particularly lower alkyl aldehydes and lower alkyl ketones such as acetaldehydes, propionaldehydes, butyraldehydes, acetone, methylethyl ketone, diethyl ketone. Various aliphatic, cycloaliphatic, aromatic, and heterocyclic amines are also useful providing they contain at least one amino group having at least one active hydrogen attached thereto. Illustrative of these amines are the mono- and di-alkylamines, particularly mono- and di-lower alkylamines, such as methylamine, ethylamine, propylamine, dodecylamine, methyl ethylamine, diethylamine; the cycloalkylamines such as cyclohexylamine, cyclopentylamine, and the lower alkyl substituted cycloalkylamines such as 3-methylcyclohexylamine; 1,4-cyclohexylenediamine; arylamines such as aniline, mono-, di-, and tri-, lower alkyl-substituted phenyl amines, naphthylamines, 1,4-phenylene diamines; lower alkanol amines such as ethanolamine and diethanolamine; alkylenediamines such as ethylene diamine, triethylene tetramine, propylene diamines, octamethylene diamines; and heterocyclic amines such as piperazine, 4-aminoethylpiperazine, 2-octadecyl-imidazoline, and oxazolidine. Boron acids are also useful conversion agents and include boronic acids (e.g., alkyl-$B(OH)_2$ or aryl-$B(OH_2)$), boric acid (i.e., $H_3BO_3$), tetraboric acid, metaboric acid, and esters of such boron acids.

The phosphorus acids are useful conversion agents and include the various alkyl and aryl phosphinic acids, phosphinus acids, phosphonic acids, and phosphonous acids. Phosphorus acids obtained by the reaction of lower alkanols or unsaturated hydrocarbons such as polyisobutenes with phosphorus oxides and phosphorus sulfides are particularly useful, e.g., $P_3O_5$ and $P_2S_5$.

Carbon dioxide can be used as the conversion agent. However, it is preferable to use this conversion agent in combination with one or more of the foregoing conversion agents. For example, the combination of water and carbon dioxide is particularly effective as a conversion agent for transforming the overbased materials into a colloidal disperse system.

As previously mentioned, the overbased materials are single phase homogeneous systems. However, depending on the reaction conditions and the choice of reactants in preparing the overbased materials, there sometimes are present in the product insoluble contaminants. These contaminants are normally unreacted basic materials such as calcium oxide, barium oxide, calcium hydroxide, barium hydroxide, or other metal base materials used as a reactant in preparing the overbased material. It has been found that a more uniform colloidal disperse system results if such contaminants are removed prior to homogenizing the overbased material with the conversion agents. Accordingly, it is preferred that any insoluble contaminants in the overbased materials be removed prior to converting the material in the colloidal disperse system. The removal of such contaminants is easily accomplished by conventional techniques such as filtration or centrifugation. It should be understood, however, that the removal of these contaminants, while desirable for reasons just mentioned, is not an absolute essential aspect of the invention and useful products can be obtained when overbased materials containing insoluble contaminants are converted to the colloidal disperse systems.

The conversion agents or a proportion thereof may be retained in the colloidal disperse system. The conversion agents are, however, not essential components of these disperse systems and it is usually desirable that as little of the conversion agents as possible be retained in the disperse systems. Since these conversion agents do not react with the overbased material in such a manner as to be permanently bound thereto through some type of chemical bonding, it is normally a simple matter to remove a major proportion of the conversion agents and, generally, substantially all of the conversion agents. Some of the conversion agents have physical properties which make them readily removable from the disperse systems. Thus, most of the free carbon dioxide gradually escapes from the disperse system during the homogenization process or upon standing thereafter. Since the liquid conversion agents are generally more volatile than the remaining components of the disperse system, they are readily removable by conventional devolatilization techniques, e.g., heating, heating at reduced pressures, and the like. For this reason, it may be desirable to select conversion agents which will have boiling points which are lower than the remaining components of the disperse system. This is another reason why the lower alkanols, mixtures thereof, and lower alkanol-water mixtures are preferred conversion agents.

Again, it is not essential that all of the conversion agent be removed from the disperse systems. However, from the standpoint of achieving uniform results, it is generally desirable to remove the conversion agents, particularly where they are volatile. In some cases, the liquid conversion agents may facilitate the mixing of the colloidal disperse system with the aqueous compositions of the invention. In such cases, it is advantageous to permit the conversion agents to remain in the disperse system until it is mixed with such aqueous compositions. Thereafter, the conversion agents can be removed from such compositions by conventional devolatilization techniques if desired.

To better illustrate the colloidal disperse systems utilized in the invention, the procedure for preparing a preferred system is described below:

As stated above, the essential materials for preparing an overbased product are (1) the organic material to be overbased, (2) an inert, non-polar organic solvent for the organic material, (3) a metal base, (4) a promoter, and (5) an acidic material. In this example, these materials are (1) calcium petrosulfonate, (2) mineral oil, (3) calcium hydroxide, (4) a mixture of methanol, isobutanol, and n-pentanol, and (5) carbon dioxide.

A reaction mixture of 1305 grams of calcium sulfonate having a metal ratio of 2.5 dissolved in mineral oil, 220 grams of methyl alcohol, 72 grams of isobutanol, and 38 grams of n-phenatanol is heated to 35° C. and subjected to the following operating cycle four times: mixing with 143 grams of 90% calcium hydroxide and treating the mixture with carbon dioxide until it has a base number of 32–39. The resulting product is then heated to 155° C. during a period of nine hours to remove the alcohols and then filtered at this temperature. The filtrate is a calcium overbased petrosulfonate having a metal ratio of 12.2.

A mixture of 150 parts of the foregoing overbased material, 15 parts of methyl alcohol, 10.5 parts of n-pentanol and 45 parts of water is heated under reflux conditions at 71°–74° C. for 13 hours. The mixture becomes a gel. It is then heated to 144° C. cover a period of six hours and diluted with 126 parts of mineral oil having a viscosity of 2000 SUS at 100° F. and the resulting mixture heated at 144° C. for an additional 4.5 hours with stirring. This thickened product is a colloidal disperse system of the type contemplated by the present invention.

The disperse systems are characterized by three essential components: (1) solid, metal-containing particles, (2) an inert, non-polar, organic liquid which functions as the disperse medium, and (3) an organic compound which is soluble in the disperse medium and the molecules of which are characterized by a hydrophobic portion and at least one polar substituent. In the colloidal disperse system described immediately above, these components are as follows: (1) calcium carbonate in the form of solid particles, (2) mineral oil, and (3) calcium petrosulfonate.

From the foregoing example, it is apparent that the solvent for the material which is overbased becomes the colloidal disperse medium or a component thereof. Of course, mixtures of other inert liquids can be substituted for the mineral oil or used in conjunction with the mineral oil prior to forming the overbased material.

It is also readily seen that the solid, metal-containing particles possess the same chemical composition as would the reaction products of the metal base and the acidic material used in preparing the overbased materials. Thus, the actual chemical identity of the metal-containing particles depends upon both the particular metal base or bases employed and the particular acidic material or materials reacted therewith. For example, if the metal base used in preparing the overbased material were barium oxide and if the acidic material was a mixture of formic and acetic acids, the metal-containing particles would be barium formates and barium acetates.

However, the physical characteristics of the metal-containing particles formed in the conversion step are quite different from the physical characteristics of any particles present in the homogeneous, single-phase overbased material which is subjected to the conversion. Particularly, such physical characteristics as particle size and structure are quite different. The solid, metal-containing particles of the colloidal disperse systems are of a size sufficient for detection by X-ray diffraction. The overbased material prior to conversion are not characterized by the presence of these detectable particles.

X-ray diffraction and electron microscope studies have been made of both overbased organic materials and colloidal disperse systems prepared therefrom. These studies establish the presence in the disperse systems of the solid metal-containing salts. For example, in the disperse system prepared herein above, the calcium carbonate is present as solid calcium carbonate having a particle size of about 40 to 50 A. (unit particle size) and interplanar spacing (dA.) of 3.035. But X-ray diffraction studies of the overbased material from which it was prepared indicate the absence of calcium carbonate of this type. In fact, calcium carbonate present as such, if any, appears to be amorphous and in solution. While not wishing to be bound by theory, it appears that conversion permits particle formation and growth. That is, the amorphous, metal-containing apparently dissolved salts or complexes present in the overbased material form solid, metal-containing particles which by a process of particles growth become colloidal particles. Thus, in the above example, the dissolved amorphous calcium carbonate salt or complex is transformed into solid particles which then "grow". In this example, they grow to a size of 40 to 50 A. In many cases, these particles apparently are crystallites. Regardless of the correctness of the postulated mechanism for particle formation the fact remains that no particles of the type predominant in the disperse systems are found in the overbased materials from which they are prepared. Accordingly, they are unquestionably formed during conversion.

As these solid metal-containing particles formed come into existence, they do so as pre-wet, pre-dispersed solid paticles which are inherently uniformly distributed throughout the other components of the disperse system. The liquid disperse medium containing these pre-wet dispersed particles is readily incorporated into the compositions and drilling fluids of the invention thus facilitating the uniform distribution of the particles throughout such compositions and drilling fluids. This pre-wet, pre-dispersed character of the solid metal-containing particles resulting from their formation is, thus, an important feature of the disperse systems.

In the foregoing example, the third component of the disperse system (i.e., the organic compound which is soluble in the disperse medium and which is characterized by molecules having a hydrophobic portion and a polar substituent) is calcium petrosulfonate,

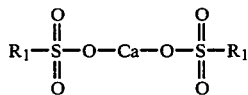

wherein $R_1$ is the residue of the petrosulfonic acid. In this case, the hydrophobic portion of the molecule is the hydrocarbon moiety of petrosulfonic, i.e., $-R_1$. The polar substituent is the metal salt moiety,

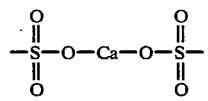

The hydrophobic portion of the organic compound is a hydrocarbon radical or a substantially hydrocarbon radical containing at least about 12 aliphatic carbon atoms. Usually the hydrocarbon portion is an aliphatic or cycloaliphatic hydrocarbon radical although aliphatic or cycloaliphatic substituted aromatic hydrocarbon radicals are also suitable. In other words, the hydrophobic portion of the organic compound is the residue of the organic material which is overbased minus its polar substituents. For example, if the material to be overbased is a carboxylic acid, sulfonic acid, or phosphorus acid, the hydrophobic portion is the residue of these acids which would result from the removal of the acid functions. Similarly, if the material to be overbased is a phenol, a nitro-substituted polyolefin, or an amine, the hydrophobic portion of the organic compound is the radical resulting from the removal of the hydroxyl, nitro, or amino group respectively. It is the hydrophobic portion of the molecule which renders the organic compound soluble in the solvent used in the overbasing process and later in the disperse medium.

Obviously, the polar portion of these organic compounds are the polar substituents such as the acid salt moiety discussed above. When the material to be overbased contains polar substituents which will react with the basic metal compound used in overbasing, for example, acid groups such as carboxy, sulfino, hydroxysulfonyl, and phosphorus acid groups or hydroxyl groups, the polar substituent of the third component is the polar group formed from the reaction. Thus, the polar substituent is the corresponding acid metal salt group or hydroxyl group metal derivative, e.g., an alkali or alkaline earth metal sulfonate, carboxylate, sulfinate, alcoholate, or phenate.

On the other hand, some of the materials to be overbased contain polar substituents which ordinarily do not react with metal bases. These substituents include nitro, amino, ketocarboxyl, carboalkoxy, etc. In the disperse systems derived from overbased materials of this type the polar substituents in the third component are unchanged from their identity in the material which was originally overbased.

The identity of the third essential component of the disperse system depends upon the identity of the starting materials (i.e., the material to be overbased and the metal base compound) used in preparing the overbased material. Once the identity of these starting materials is known, the identity of the third component in the colloidal disperse system is automatically established. Thus, from the identity of the original material, the identity of the hydrophobic portion of the third component in the disperse system is readily established as being the residue of that material minus the polar substituents attached thereto. The identity of the polar substituents on the third component is established as a matter of chemistry. If the polar groups on the material to be overbased undergo reaction with the metal base, for example, if they are acid functions, hydroxy groups, etc., the polar substituent in the final product will correspond to the reaction product of the original substituent and the metal base. On the other hand, if the polar substituent in the material to be overbased is one which does not react with metal bases, then the polar substituent of the third component is the same as the original substituent.

As previously mentioned, this third component can orient itself around the metal-containing particles to form micellar colloidal particles. Accordingly, it can exist in the disperse system as an individual liquid component dissolved in the disperse medium or it can be associated with the metal-containing particles as a component of micellar colloidal particles.

Examples 1-66 illustrate various overbased materials and colloidal disperse systems prepared from these overbased materials. Unless otherwise indicated, "percentages" and "parts" refer to percent by weight and parts by weight. Where temperatures exceed the boiling points of the components of the reaction mixture, obviously reflux conditions are employed unless the reaction products are being heated to remove volatile components.

Examples 1 through 23 are directed to the preparation of Newtonian overbased materials illustrative of the types which can be used to prepare non-Newtonian colloidal disperse systems. The term "naphtha" as used in the following examples refers to petroleum distillates boiling in the range of about 90° C. to about 150° C. and usually designated Varnish Maker's and Painter's Naphtha.

EXAMPLE 1

To a mixture of 3,245 parts (12.5 equivalents) of a mineral oil solution of barium petroleum sulfonate (sulfate ash of 7.6%), 32.5 parts of octylphenol, 197 parts of water, there is added 73 parts of barium oxide within a period of 30 minutes at 57°–84° C. The mixture is heated at 100° C. for one hour to remove substantially all water and blown with 75 parts of carbon dioxide at 133° to 170° C. within a period of three hours. A mixture of 1,000 parts of the above carbonated intermediate product, 121.8 parts of octylphenol, and 234 parts of barium hydroxide is heated at 100° C. and then at 150° C. for one hour. The mixture is then blown with carbon dioxide at 150° for one hour at a rate of 3 cubic feet per hour. The carbonated product is filtered and the filtrate has a sulfate ash content of 39.8% and a metal ratio of 9.3

EXAMPLE 2

To a mixture of 3,245 parts (12.5 equivalents) of barium petroleum sulfonate, 1,460 parts (7.5 equivalents) of heptylphenol, and 2,100 parts of water in 8,045 parts of mineral oil there is added at 180° C. 7,400 parts (96.5 equivalents) of barium oxide. The addition of barium oxide causes the temperature to rise to 143° C. which temperature is maintained until all the water has been distilled. The mixture is then blown with carbon dioxide until it is substantially neutral. The product is diluted with 5,695 parts of mineral oil and filtered. The filtrate has a barium sulfate ash content of 30.5% and a metal ratio of 8.1.

EXAMPLE 3

A mixture of 1,285 parts (1.0 equivalent) of 40% barium petroleum sulfonate and 500 milliliters (12.5 equivalents) of methanol is stirred at 55°–60° C. while 301 parts (3.9 equivalents) of barium oxide is added portion-wise over a period of one hour. The mixture is stirred an additional two hours at 45°–55° C., then treated with carbon dioxide at 55°–65° C. for two hours. The resulting mixture is freed of methanol by heating to 150° C. The residue is filtered through a siliceous filter aid, the clear, brown filtrate analyzing as: sulfate ash, 33.2%; slightly acid; metal ratio, 4.7.

EXAMPLE 4

(a) To a mixture of 1,145 parts of a mineral oil solution of a 40% solution of barium mahogany sulfonates (1.0 equivalent) and 100 parts of methyl alcohol at 55° C., there is added 220 parts of barium oxide while the mixture is being blown with carbon dioxide at a rate of 2 to 3 cubic feet per hour. To this mixture there is added an additional 78 parts of methyl alcohol and then 460 parts of barium oxide while the mixture is blown with carbon dioxide. The carbonated product is heated to 150° C. for one hour and filtered. The filtrate has a barium sulfate ash content of 53.8% and a metal ratio of 8.9.

(b) A carbonated basic metal salt is prepared in accordance with the procedure of (a) except that a total of 16 equivalents of barium oxide is used per equivalent of the barium mahogany sulfonate. The product has a metal ratio of 13.4.

EXAMPLE 5

A mixture of 520 parts of a mineral oil, 480 parts of a sodium petroleum sulfonate (molecular weight of 480), and 84 parts of water is heated at 100° C. for four hours. The mixture is then heated with 86 parts of a 76% aqueous solution of calcium chloride and 72 parts of lime (90% purity) at 100° C. for two hours, dehydrated by heating to a water content of less than 0.5%, cooled to 50° C., mixed with 130 parts of methyl alcohol, and then blown with carbon dioxide at 50° C. until substantially neutral. The mixture is then heated to 150° C. to remove the methyl alcohol and water and the resulting oil solution of the basic calcium sulfonate filtered. The filtrate is found to have a calcium sulfate ash content of 16% and a metal ratio of 2.5.

A mixture of 1,305 parts of the above carbonated calcium sulfonate, 930 parts of mineral oil, 220 parts of methyl alcohol, 72 parts of isobutyl alcohol, and 38 parts of primary amyl alcohol is prepared, heated to 35° C., and subjected to the following operating cycle four times: mixing with 143 parts of 90% calcium hydroxide and treating the mixture with carbon dioxide until it has a base number of 32–39. The resulting product is then heated to 155° C. during a period of nine hours to remove the alcohols and filtered through a siliceous filter aid at this temperature. The filtrate has a calcium sulfate ash content of 39.5% and a metal ratio of 12.2.

EXAMPLE 6

A basic metal salt is prepared by the procedure described in Example 5 except that the slightly basic calcium sulfonate having a metal ratio of 2.5 is replaced with a mixture of that calcium sulfonate (280 parts) and tall oil acid (970 parts having an equivalent weight of 340) and that the total amount of calcium hydroxide used is 930 parts. The resulting highly basic metal salt of the process has a calcium sulfate ash content of 48%, a metal ratio of 7.7, and an oil content of 31%.

EXAMPLE 7

A highly basic metal salt is prepared by the procedure of Example 5 except that the slightly basic calcium sulfonate starting material having a metal ratio of 2.5 is replaced with tall oil acids (1,250 parts having an equivalent weight of 340) and the total amount of calcium hydroxide used is 772 parts. The resulting highly basic metal salt has a metal ratio of 5.2, a calcium sulfate ash content of 41%, and an oil content of 33%.

EXAMPLE 8

A normal calcium mahogany sulfonate is prepared by metathesis of a 60% oil solution of sodium mahogany sulfonate (750 parts) with a solution of 67 parts of calcium chloride and 63 parts of water. The reaction mass is heated for four hours at 90° to 100° C. to effect the conversion of the sodium mahogany sulfonate to calcium mahogany sulfonate. Then 54 parts of lime is added and the whole is heated to 150° C. over a period of five hours. When the whole has cooled to 40° C., 98 parts of methanol is added and 152 parts of carbon dioxide is introduced over a period of 20 hours at 42°–43° C. Water and alcohol are then removed by heating the mass to 150° C. The residue in the reaction vessel is diluted with 100 parts of low viscosity mineral oil. The filtered oil solution of the desired carbonated calcium sulfonate overbased material has the following analysis: sulfate ash content, 16.4%; neutralization number, 0.6 (acidic); and a metal ratio of 2.50. By adding barium or calcium oxide or hydroxide to this product with subsequent carbonation, the metal ratio can be increased to a ratio of 3.5 or greater as desired.

EXAMPLE 9

A mixture comprising 1,595 parts of the overbased material of Example 7 (1.54 equivalents based on sulfonic acid anion), 167 parts of the calcium phenate prepared as indicated below (0.19 equivalent), 616 parts of mineral oil, 157 parts of 91% calcium hydroxide (3.86 equivalents), 288 parts of methanol, 88 parts of isobutanol, and 56 parts of mixed isomeric primary amyl alcohols (containing about 65% normal amyl, 3% isoamyl and 32% of 2-methyl-1-butyl alcohols) is stirred vigorously at 40° C. and 25 parts of carbon dioxide is introduced over a period of two hours at 40°-50° C. Thereafter, three additional portions of calcium hydroxide, each amounting to 157 parts, are added and each such addition is followed by the introduction of carbon dioxide as previously illustrated. After the fourth calcium hydroxide addition and the carbonation step is completed, the reaction mass is carbonated for an additional hour at 43°-47° C. to reduce neutralization number of the mass to 4.0 (basic). The substantially neutral, carbonated reaction mixture is freed from alcohol and any water reaction by heating to 150° C. and simultaneously blowing it with nitrogen. The residue in the reaction vessel is filtered. The filtrate, an oil solution of the desired substantially neutral, carbonated calcium sulfonate overbased material of high metal ratio, shows the following analysis: sulfate ash content, 41.11%; neutralization number 0.9 (basic); and a metal ratio of 12.55.

The calcium phenate used above is prepared by adding 2,250 parts of mineral oil, 960 parts (5 moles) of heptylphenol, and 50 parts of water into a reaction vessel and stirring at 25° C. The mixture is heated to 40° C. and 7 parts of calcium hydroxide and 231 parts (7 moles) of 91% commercial paraformaldehyde is added over a period of one hour. The whole is heated to 80° C. and 200 additional parts of calcium hydroxide (making a total of 207 parts or 5 moles) is added over a period of one hour at 80°-90° C. The whole is heated to 150° C. and maintained at that temperature for 12 hours while nitrogen is blown through the mixture to assist in the removal of water. If foaming is encountered, a few drops of polymerized dimethyl silicone foam inhibitor may be added to control the foaming. The reaction mass is then filtered. The filtrate, a 33.6% oil solution of the desired calcium phenate of heptylphenol-formaldehyde condensation product is found to contain 7.56% sulfate ash.

EXAMPLE 10

A mixture of 574 parts (0.5 equivalents) of 40% barium petroleum sulfonate, 98 parts (1.0 equivalent) of furfuryl alcohol, and 762 parts of mineral oil is heated with stirring at 100° C. for an hour, then treated portionwise over a 15-minute period with 230 parts (3.0 equivalents) of barium oxide. During this latter period, the temperature rises to 120° C. (because of the exothermic nature of the reaction of barium oxide and the alcohol). The mixture then is heated to 150°-160° C. for an hour, and treated subsequently at this temperature for 1.5 hours with carbon dioxide. The materials concentrated by heating to a temperature of 150° C. at a pressure of 10 mm. Hg. and thereafter filtered to yield a clear, oil-soluble filtrate having the following analysis: sulfate ash content, 21.4%; neutralization number, 2.6 (basic); and a metal ratio of 6.1.

EXAMPLE 11

To a mixture of 1,614 parts (3 equivalents) of a polyisobutenyl succinic anhydride (prepared by the reaction of a chlorinated polyisobutene having an average chlorine content of 4.3% and an average of 67 carbon atoms with maleic anhydride at about 200° C.), 4,313 parts of mineral oil, 345 parts (1.8 equivalents) of heptylphenol, and 200 parts of water, at 80° C., there is added 1,038 parts (24.7 equivalents) of lithium hydroxide monohydrate over a period of 0.75 hour while heating to 105° C. Isooctanol (75 parts) is added while the mixture is heated to 150° C. over a 1.5-hour period. The mixture is maintained at 150°-170° C. and blown with carbon dioxide at a rate of four cubic feet per hour for 3.5 hours. The reaction mixture is filtered through a filter aid and the filtrate is the desired product having a sulfate ash content of 18.9% and a metal ratio of 8.0.

EXAMPLE 12

A mixture of 244 parts (0.87 equivalent) of oleic acid, 180 parts of primary isooctanol, and 400 parts of mineral oil is heated to 70° C. whereupon 172.6 parts (2.7 equivalents) of cadmium oxide is added. The mixture is heated for three hours at a temperature of 150° to 160° C. while removing water. Barium hydroxide monhydrate (324 parts, 3.39 equivalents) is then added to the mixture over a period of one hour while continuing to remove water by means of a side-arm water trap. Carbon dioxide is blown through the mixture at a temperature of from 150°-160° C. until the mixture is slightly acidic to phenolphthalein. Upon completion of the carbonation, the mixture is stripped to a temperature of 150° C. at 35 mm. Hg. to remove substantially all the remaining water and alcohol. The residue is the desired overbased product containing both barium and cadmium metal.

EXAMPLE 13

The procedure of Example 10 is repeated except that the barium sulfonate is replaced by an equivalent amount of potassium sulfonate, and potassium oxide is used in lieu of the barium oxide resulting in the preparation of the corresponding potassium overbased material.

EXAMPLE 14

To a mixture of 423 parts (1.0 equivalent) of sperm oil, 124 parts (0.6 equivalent) of heptylphenol, 500 parts of mineral oil, and 150 parts of water there are added 308 parts (4.0 equivalents) of barium oxide. The temperature of the mixture is 70° C. during such addition. This mixture is heated at reflux temperature for one hour, dried by heating at about 150° C. and thereafter carbonated by treatment with carbon dioxide at the same temperature until the reaction mass was slightly acidic. Filtration yields a clear, light brown, non-viscous overbased liquid material having the following analysis: sulfate ash content, 32.0%; neutralization number 0.5 (basic); metal ratio, 6.5.

EXAMPLE 15

A mixture of 6000 parts of a 30% solution of barium petroleum sulfonate (sulfate ash 7.6%), 348 parts of paratertiary butylphenol, and 2,911 parts of water are heated to a temperature 60° C. while slowly adding 1,000 parts of barium oxide and raising the temperature to 94°–98° C. The temperature is held within this range for about one hour and then slowly raised over a period of 7.5 hours to 150° C. and held at this level for an additional hour assuring substantial removal of all water. The resulting overbased material is a brown liquid having the following analysis: sulfate ash content, 26.0%; metal ratio, 4.35.

This product is then treated with $SO_2$ until 327 parts of the mass combined with the overbased material. The product thus obtained has a neutralization number of zero. The $SO_2$-treated material is liquid and brown in color.

1000 parts of the $SO_2$-treated overbased material produced according to the preceding paragraph is mixed with 286 parts of water and heated to a temperature of about 60° C. Subsequently, 107.5 parts of barium oxide are added slowly and the temperature is maintained at 94°–98° C. for one hour. Then the total reaction mass is heated to 150° C. over a 1-1/16-hour period and held there for a period of one hour. The resulting overbased material is purified by filtration, the filtrate being a brown, liquid overbased material having the following analysis: sulfate ash content, 33.7%; basic number, 38.6; metal ratio, 6.3.

EXAMPLE 16

(a) A polyisobutylene having a molecular weight of 700–800 is prepared by the aluminum chloride-catalyzed polymerization of isobutylene at 0°–30° C., is nitrated with a 10% excess (1.1 moles) of 70% aqueous nitric acid at 70°–75° C. for four hours. The volatile components of the product mixture are removed by heating to 75° C. at a pressure of 75 mm. Hg. To a mixture of 151 parts (0.19 equivalent) of this nitrated polyisobutylene, 113 parts (0.6 equivalent) of heptylphenol, 155 parts of water, and 2,057 parts of mineral oil there is added 612 parts (8 equivalents) of barium oxide. The mixture is at 70° C. during such addition. This mixture is heated at 150° C. for an hour, then treated with carbon dioxide at this same temperature until the mixture is neutral (phenolphthalein indicator; ASTM D-974-53T procedure at 25° C.; a measurement of the degree of conversion of the metal reactant, i.e., barium oxide, bicarbonation). The product mixture is filtered and filtrate has the following analysis: sulfate ash content, 27.6%; percent N, 0.06; and metal ratio, 9.

(b) A mixture of 611 parts (0.75 mole) of the nitrated polyisobutylene of part (a), 96 parts (0.045 mole) of heptylphenol, 2,104 parts of mineral oil, 188 parts of water and 736 parts (4.8 moles) of barium oxide is heated at reflux temperature for one hour. The water is vaporized and carbon dioxide passed into the mixture at 150° C. until the mixture is no longer basic. This carbonated mixture is filtered and the clear fluid filtrate has the following analysis: sulfate ash content, 26.3%; percent N, 0.15; base number 2.4; metal ratio 6.7.

EXAMPLE 17

A mixture of 630 parts (2 equivalents) of a rosin amine (consisting essentially of dehydroabietyl amine) having a nitrogen content of 44% and 245 parts (1.2 equivalents) of heptylphenol having a hydroxyl content of 8.3% is heated to 90° C. and thereafter mixed with 230 parts (3 equivalents) of barium oxide at 90°–140° C. The mixture is purged with nitrogen at 140° C. A 600-part portion is diluted with 400 parts of mineral oil and filtered. The filtrate is blown with carbon dioxide, diluted with benzene, heated to remove the benzene, mixed with xylene, and filtered. The filtrate, a 20% xylene solution of the product, has a barium sulfate ash content of 25.1%, a nitrogen content of 2%, and a reflux base number of 119.

The term "reflux base number" refers to the basicity of the metal composition and is expressed in terms of milligrams of KOH which are equivalent to one gram of the composition.

EXAMPLE 18

To a mixture of 408 parts (2 equivalents) of heptylphenol having a hydroxy content of 8.3% and 264 parts of xylene there is added 383 parts (5 equivalents) of barium oxide in small increments at 85°–110° C. Thereafter, 6 parts of water are added and the mixture is carbonated at 100°–130° C. and filtered. The filtrate is heated to 100° C. and diluted with xylene to a 25% xylene solution. This solution has a barium sulfate ash content of 41% and a reflux base number of 137.

EXAMPLE 19

A mixture of alkylated benzene sulfonic acids and naphtha is prepared by adding 1,000 parts of a mineral oil solution of the acid containing 18% by weight mineral oil (1.44 equivalents of acid) and 222 parts of naphtha. While stirring the mixture, 3 parts of calcium chloride dissolved in 90 parts of water and 53 parts of Mississippi lime (calcium hydroxide) is added. This mixture is heated to 97°–99° C. and held at this temperature for 0.5 hour. Then 80 parts of Mississippi lime are added to the reaction mixture with stirring and nitrogen gas is bubbled therethrough to remove water, while heating to 150° C. over a three-hour period. The reaction mixture is then cooled to 50° C. and 170 parts of methanol are added. The resulting mixture is blown with carbon dioxide at a rate of two cubic feet per hour until substantially neutral. The carbon dioxide blowing is discontinued and the water and methanol are stripped from the reaction mixture by heating and bubbling nitrogen gas therethrough. While heating to remove the water and methanol, the temperature rose to 146° C. over a 1.75-hour period. At this point the metal ratio of the overbased material is 2.5 and the product is a clear, dark-brown viscous liquid. This material is permitted to cool to 50° C. and thereafter 1,256 parts thereof are mixed with 574 parts of naphtha, 222 parts of methanol, 496 parts of Mississippi lime, and 111 parts of an equal molar mixture of isobutanol and amyl alcohol. The mixture is thoroughly stirred and carbon dioxide is blown therethrough at the rate of two cubic feet per hour for 0.5 hour. An additional 124 parts of Mississippi lime are added to the mixture with stirring and the $CO_2$ blowing continued. Two additional 124-part increments of Mississippi lime are added to the reaction mixture while continuing the carbonation. Upon the addition of the last increment, carbon dioxide is bubbled through the mixture for an additional hour. Thereafter, the reaction mixture is gradually heated to about 146° C. over a 3.25-hour period while blowing the nitrogen to remove water and methanol from the mixure. Thereafter, the mixture is permitted to cool to room temperature and filtered producing 1,895 parts of the desired overbased material having a metal ratio of 11.3. The material contains 6.8% mineral oil, 4.18% of the isobutanol-amyl alcohol and 30.1% naphtha.

EXAMPLE 20

1274 parts of methanol, 11.3 parts of calcium chloride and 90.6 parts of tap water are added to a resin reactor equipped with a heating mantle, thermocouple, gas inlet tube, condenser and metal stirrer. The mixture is heated to 48° C. with stirring. 257.8 parts of Silo lime (calcium hydroxide) are added to provide a slurry. 2,830 parts of alkylated benzene sulfonic acid are added to the whole over a period of one hour. The temperature of the whole rises to 53° C. 2,510 parts of SC Solvent 100 (a high-boiling alkylated aromatic solvent supplied by Ohio Solvents) are added. The whole is stirred for 0.5 hour. Three increments of 709.1 parts each of Silo lime are added to the whole and carbon dioxide at a rate of five cubic feet per hour is bubbled through the whole after each increment. Total blowing with carbon dioxide is approximately seven hours with the temperature of the whole varying from 40° to 55° C. The reactor is equipped with a trap. Methanol and water are stripped from the whole by bubbling nitrogen at a rate of two cubic feet per hour through the whole over a 12-hour period while maintaining the temperature of the whole at 155° C. The whole is held at a temperature of 155° C. for 15 minutes, and then cooled to room temperature. The whole is filtered through a Gyro Tester clarifier. The solids content is adjusted to 70% solids with SC Solvent 100.

EXAMPLE 21

A mixture of 406 parts of naphtha and 214 parts of amyl alcohol is placed in a three-liter flask equipped with reflux condenser, gas inlet tubes, and stirrer. The mixture is stirred rapidly while heating to 38° C. and adding 27 parts of barium oxide. Then 27 parts of water are added slowly and the temperature rises to 45° C. Stirring is maintained while adding 73 parts of oleic acid over a 0.25-hour period. The mixture is heated to 95° C. with continued mixing. Heating is discontinued and 523 parts of barium oxide are slowly added to the mixture. The temperature rises to about 115° C. and the mixture is permitted to cool to 90° C. whereupon 67 parts of water are slowly added to the mixture and the temperature rises to 107° C. The mixture is then heated within the range of 107°–120° C. to remove water over a 3.3-hour period while bubbling nitrogen through the mass. Subsequently, 427 parts of oleic acid are added over a 1.3-hour period while maintaining a temperature of 120°–125° C. Thereafter heating is terminated and 236 parts of naphtha are added. Carbonation is commenced by bubbling carbon dioxide through the mass at two cubic feet per hour for 1.5 hours during which the temperature is held at 108°–117° C. The mixture is heated under a nitrogen purge to remove water. The reaction mixture is filtered twice producing a filtrate analyzing as follows: sulfate ash content, 34.42%; metal ratio, 313. The filtrate contains 10.7% amyl alcohol and 32% naphtha.

EXAMPLE 22

A reaction mixture of 1,800 parts of a calcium overbased petrosulfonic acid containing 21.7% mineral oil and 36.14% naphtha, 426 parts naphtha, 255 parts of methanol, and 127 parts of an equal molar mixture of isobutanol and amyl alcohol are heated to 45° C. under reflux conditions and 148 parts of Mississippi lime (commercial calcium hydroxide) are added thereto. The reaction mass is then blown with carbon dioxide at a rate of two cubic feet per hour and thereafter 148 parts of additional Mississippi lime are added. Carbonation is continued for another hour at the same rate. Two additional 147-part increments of Mississippi lime are added to the reaction mixture, each increment followed by about a one-hour carbonation process. Thereafter, the reaction mass is heated to a temperature of 138° C. while bubbling nitrogen therethrough to remove water and methanol. After filtration, 2,220 parts of a solution of the dispersed barium overbased petrosulfonate acid is obtained having a metal ratio of 12.2 and containing 12.5% mineral oil, 34.15% naphtha, and 4.03% of the isobutanol-amyl alcohol mixture.

EXAMPLE 23

A mixture of 1000 parts of a 60% mineral oil solution of sodium petroleum sulfonate (having a sulfated ash content of about 8.5%) and a solution of 71.3 parts of 96% calcium chloride in 84 parts of water is mixed at 100° C. for 0.25 hour. Then 67 parts of hydrated lime is added and the whole is heated at 100° C. for 0.25 hour then dried by heating to 145° C. to remove water. The residue is cooled and adjusted to 0.7% water content. 130 parts methanol are added and the whole is blown with carbon dioxide at 45°–50° C. until it is substantially neutral. Water and alcohol are removed by heating the mass to 150° C. and the resulting oil solution is filtered. The resulting product is carbonated calcium sulfonate overbased material containing 4.78% calcium and a metal ratio of 2.5.

A mixture of 1000 parts of the above carbonated calcium sulfonate overbased material, 316 parts of mineral oil, 176 parts of methanol, 58 parts of isobutyl alcohol, 30 parts of primary amyl alcohol and 52.6 parts of the calcium phenate of Example 8 is prepared, heated to 35° C., and subjected to the following operating cycle four times: mixing with 93.6 parts of 97.3% calcium hydroxide and treating the mixture with carbon dioxide until it has a base number of 35–46. The resulting product is heated to 150° C. and simultaneously blown with nitrogen to remove alcohol and water, and then filtered. The filtrate has a calcium content of 12.0% and a metal ratio of 12.

Examples 1–23 illustrate various means for preparing overbased materials suitable for use in conversion to the non-Mewtonian colloidal disperse systems utilized in the present invention. Obviously, it is within the skill of the art to vary these examples to produce any desired overbased material. Thus, other acidic materials such as mentioned hereinbefore can be substituted for the acidic materials used in the above examples. Similarly, other metal bases can be employed in lieu of the metal base used in any given example, or mixtures of bases and/or mixtures of materials which can be overbased can be utilized. Similarly, the amount of mineral oil or other non-polar, inert, organic liquid used as the overbasing medium can be varied widely both during overbasing and in the overbased product.

Examples 24–66 illustrate the conversion of Newtonian overbased materials into the non-Newtonian colloidal disperse systems by homogenization with conversion agents.

EXAMPLE 24

To 733 parts of the overbased material of Example 4(a), there is added 179 parts of acetic acid and 275 parts of a mineral oil (having a viscosity of 2000 SUS at 1000° F.) at 90° C. over a period of 1.5 hours with vigorous agitation. The mixture is then homogenized at 150° C. for two hours and the resulting material is the desired colloidal disperse system.

EXAMPLE 25

A mixture of 960 parts of the overbased material of Example 4(b), 256 parts of acetic acid, and 200 parts of a mineral oil (having a viscosity of 2000 SUS at 100° C.) is homogenized by vigorous stirring at 150° C. for two hours. The resulting product is a non-Newtonian colloidal disperse system of the type contemplated for use by the present invention.

The overbased material of Examples 24 and 25 can be converted without the addition of additional mineral oil or if another inert organic liquid is substituted for the mineral oil.

EXAMPLE 26

A mixture of 150 parts of the overbased material of Example 5, 15 parts of methyl alcohol, 10.5 parts of amyl alcohol, and 45 parts of water is heated under reflux conditions at 71°–74° C. for 13 hours whereupon the mixture gels. The gel is heated for six hours at 144° C., diluted with 126 parts of the mineral oil. The diluted mixture is heated to 144° C. for an additional 4.5 hours. The resulting thickened product is a colloidal disperse system. Again, it is not necessary that the material be diluted with mineral oil in order to be useful.

EXAMPLE 27

A mixture of 1000 parts of the product of Example 9, 80 parts of methanol, 40 parts of mixed primary amyl alcohols (containing about 65% normal amyl alcohol, 3% isoamyl alcohol, and 32% of 2-methyl-1-butyl alcohol) and 80 parts of water are added to a reaction vessel and heated to 70° C. and maintained at that temperature for 4.2 hours. The overbased material is converted to a gelatinous mass, the latter is stirred and heated at 150° C. for a period of about two hours to remove substantially all the alcohols and water. The residue is a dark-green gel.

EXAMPLE 28 The procedure of Example 27 is repeated except that 120 parts of water is used to replace the water-alkanol mixture employed as the conversion agent therein. Conversion of the Newtonian overbased material into the non-Newtonian colloidal disperse system requires about five hours of homogenization.

The disperse system is in the form of a gel.

EXAMPLE 29

To 600 parts of the overbased material of Example 5, there is added 300 parts of dioctylphthalate, 48 parts of methanol, 36 parts of isopropyl alcohol, and 36 parts of water. The mixture is heated to 70°–77° C. and maintained at this temperature for four hours during which the mixture becomes more viscous. The viscous solution is then blown with carbon dioxide for one hour until substantially neutral to phenolphthalein. The alcohols and water are removed by heating to approximately 150° C. The residue is the desired colloidal disperse system.

EXAMPLE 30

To 800 parts of the overbased material of Example 5, there is added 300 parts of kerosene, 120 parts of an alcohol-water mixture comprising 64 parts of methanol, 32 parts of water and 32 parts of primary amyl alcohol. The mixture is heated to 75° C. and maintained at this temperature for two hours during which time the viscosity of the mixture increases. The water and alcohols are removed by heating the mixture to about 150° C. while blowing with nitrogen for one hour. The residue is the desired colloidal disperse system having the consistency of a gel.

EXAMPLE 31

A mixture of 340 parts of the product of Example 5, 68 parts of an alcohol-water solution (the alcohol-water solution consisting of 27.2 parts of methanol, 20.4 parts of isopropyl alcohol and 20.4 parts of water), and 170 parts of heptane is heated to 65° C. During this period, the viscosity of the mixture increases from an initial value of 6,250 to 54,000.

The thickened colloidal disperse system is further neutralized by blowing the carbon dioxide at the rate of five pounds per hour for one hour. The resulting mass has a neutralization number of 0.87 (acid to phenolphthalein indicator).

EXAMPLE 32

The procedure of Example 31 is repeated except that the calcium overbased material of Example 5 is replaced by an equivalent amount of the cadmium and barium overbased material of Example 12. Xylene (200 parts) is used in lieu of the heptane and the further carbonation step is omitted.

EXAMPLE 33

A mixture of 500 parts of the overbased material of Example 5, 312 parts of kerosene, 40 parts of methylethyl ketone, 20 parts of isopropyl alcohol, and 50 parts of water is prepared and heated to 75° C. The mixture is maintained at a temperature of 70°–75° C. for five hours and then heated to 150° C. to remove the volatile components. The mixture is thereafter blown with ammonia for 30 minutes to remove most of the final traces of volatile materials and thereafter permitted to cool to room temperature. The residue is a brownish-tan colloidal disperse system in the form of a gel.

EXAMPLE 34

A mixture of 500 parts of the product of Example 5, 312 parts of kerosene, 40 parts of acetone, and 60 parts of water is heated to reflux and maintained at this temperature for five hours with stirring. The temperature of the material is then raised to about 155° C. while removing the volatile components. The residue is a viscous gel-like material which is the desired colloidal disperse system.

EXAMPLE 35

The procedure of Example 34 is repeated with the substitution of 312 parts of heptane for the kerosene and 60 parts of water for the acetone-water mixture therein. At the completion of the homogenization, hydrogen gas is bubbled through the gel to facilitate the removal of water and any other volatile components.

EXAMPLE 36

To 500 parts of the overbased material of Example 8, there is added 312 parts of kerosene, 40 parts of o-cresol, and 50 parts of water. This mixture is heated to the reflux temperature (70°–75° C.) and maintained at this temperature for five hours. The volatile components are then removed from the mixture by heating to 150° C. over a period of two hours. The residue is the desired colloidal disperse system containing about 16% by weight of kerosene.

EXAMPLE 37

A mixture of 500 parts of the overbased material of Example 4(a) and 312 parts of heptane is heated to 80° C. whereupon 149 parts of glacial acetic acid (99.8%) is added dropwise over a period of five hours. The mixture is then heated to 150° C. to remove the volatile components. The resulting gel-like material is the desired colloidal disperse system.

EXAMPLE 38

The procedure of Example 37 is repeated except that 232 parts of boric acid is used in lieu of the acetic acid. The desired gel is produced.

EXAMPLE 39

The procedure of Example 35 is repeated except that the water is replaced by 40 parts of methanol and 40 parts of diethylene triamine. Upon completion of the homogenization, a gel-like colloidal disperse system is produced.

EXAMPLE 40

A mixture of 500 parts of the product of Example 5 and 300 parts of heptane is heated to 80° C. and 68 parts of anthranilic acid is added over a period of one hour while maintaining the reaction temperature between 80° and 95° C. The reaction mixture is then heated to 150° C. over a two-hour period and then blown with nitrogen for 15 minutes to remove the volatile components. The resulting colloidal disperse system is a moderately stiff gel.

EXAMPLE 41

The procedure of Example 40 is repeated except that the anthranilic acid is replaced by 87 parts of adipic acid. The resulting product is very viscous and is the desired colloidal disperse system. This gel can be diluted, if desired, with mineral oil or any of the other materials said to be suitable for disperse mediums hereinabove.

EXAMPLE 42

A mixture of 500 parts of the product of Example 7 and 300 parts of heptane is heated to 80° C. whereupon 148 parts of glacial acetic acid is added over a period of one hour while maintaining the temperature within the range of about 80°–88° C. The mixture is then heated to 150° C. to remove the volatile components. The residue is a viscous gel. This gel may be diluted with a material suitable as a disperse medium.

EXAMPLE 43

A mixture of 300 parts of toluene and 500 parts of an overbased material prepared according to the procedure of Example 6 and having a sulfate ash content of 41.8% is heated to 80° C. whereupon 124 parts of glacial acetic acid is added over a period of one hour. The mixture is then heated to 175° C. to remove the volatile components. During this heating, the reaction mixture becomes very viscous and 380 parts of mineral oil is added to facilitate the removal of the volatile components. The resulting colloidal disperse system is a viscous grease-like material.

EXAMPLE 44

A mixture of 700 parts of the overbased material of Example 4(b), 70 parts of water, and 350 parts of toluene is heated to reflux and blown with carbon dioxide at the rate of one cubic foot per hour for one hour. The reaction product is a soft gel.

EXAMPLE 45

The procedure of Example 41 is repeated except that the adipic acid is replaced by 450 parts of di(4-methylamyl)phosphorodithioic acid. The resulting product is a gel.

EXAMPLE 46

The procedure of Example 39 is repeated except that the methanol-amine mixture is replaced by 250 parts of a phosphorus acid. The product is a viscous brown gel-like colloidal disperse system. The phosphorus acid is obtained by treating with steam at 150° C. the product obtained by reacting 1000 parts of polyisobutene having a molecular weight of about 60,000, with 24 parts of phosphorus pentasulfide.

EXAMPLE 47

The procedure of Example 43 is repeated except that the overbased material therein is replaced by an equivalent amount of the potassium overbased material of Example 13 and the heptane is replaced by an equivalent amount of toluene.

EXAMPLE 48

The overbased material of Example 5 is isolated as a dry powder by precipitation out of a benzene solution through the addition thereto of acetone. The precipitate is washed with acetone and dried. A mixture of 45 parts of a toluene solution of the above powder (364 parts of toluene added to 500 parts of the powder to produce a solution having a sulfate ash content of 43%), 36 parts of methanol, 27 parts of water, and 18 parts of mixed primary amyl alcohols (described in Example 27) is heated to a temperature within the range of 70°–75° C. The mixture is maintained at this temperature for 2.5 hours and then heated to remove the alkanols. The resulting material is a colloidal disperse system substantially free from any mineral oil. If desired, the toluene present in the colloidal disperse system as the disperse medium can be removed by first diluting the disperse system with mineral oil and thereafter heating the diluted mixture to a temperature of about 160° C. whereupon the toluene is vaporized.

EXAMPLE 49

Calcium overhead material similar to that prepared in Example 5 is made by substituting xylene for the mineral oil used therein. The resulting overbased material has a xylene content of about 25% and a sulfate ash content of 39.3%. This overbased material is converted to a colloidal disperse system by homogenizing 100 parts of the overbased material with 8 parts of methanol, 4 parts of the amyl alcohol mixture of Example 27, and 6 parts of water. The reaction mass is mixed for six hours while maintaining the temperature at 75°–78° C. Thereafter, the disperse system is heated to remove the alkanols and water. If desired, the gel can be diluted by the addition of mineral oil, toluene, xylene, or any other suitable disperse medium.

EXAMPLE 50

A solution of 1000 parts of the gel-like colloidal disperse system of Example 26 is dissolved in 1000 parts toluene by continuous agitation of these two components for about three hours. A mixture of 1000 parts of the resulting solution, 20 parts of water, and 20 parts of methanol are added to a three-liter flask. Thereafter, 92.5 parts of calcium hydroxide is slowly added to the flask with stirring. An exothermic reaction takes place raising the temperature to 32° C. The entire reaction mass is then heated to about 60° C. over a 0.25-hour period. The heated mass is then blown with carbon dioxide at the rate of three standard cubic feet per hour for one hour while maintaining the temperature at 60°–70° C. At the conclusion of the carbonation, the mass is heated to about 150° C. over a 0.75-hour period to remove water, methanol and toluene. The resulting product is a clear, light-brown colloidal disperse system in the form of a gel. In this manner additional metal-containing particles are incorporated into the colloidal disperse system.

At the conclusion of the carbonation step and prior to removing the water, methanol and toluene, more calcium hydroxide could have been added to the mixture and the carbonation step repeated in order to add still additional metal-containing particles to the colloidal disperse system.

EXAMPLE 51

A mixture of 1200 parts of the gel produced according to Example 26, 600 parts of toluene, and 48 parts of water is blown with carbon dioxide at two standard cubic feet per hour while maintaining the temperature at 55°–65° C. for one hour. The carbonated reaction mass is then heated at 150° C. for 1.75 hours to remove the water and toluene. This procedure improves the texture of the colloidal disperse systems and converts any calcium oxide or calcium hydroxide present in the gel into calcium carbonate particles.

EXAMPLE 52

A mixture comprising 300 parts of water, 70 parts of the amyl alcohol mixture identified in Example 27 above, 100 parts of methanol, and 1000 parts of a barium overbased oleic acid prepared according to the general technique of Example 3 by substituting oleic acid for the petrosulfonic acid used therein and having a metal ratio of about 3.5, is thoroughly mixed for about 2.5 hours while maintaining the temperature within the range of from about 72°–74° C. At this point the resulting colloidal disperse system is in the form of a very soft gel. This material is then heated to about 150° C. for a two-hour period to expel methanol, the amyl alcohols, and water. Upon removal of these liquids, the colloidal disperse system is a moderately stiff, gel-like material.

EXAMPLE 53

A dark brown colloidal disperse system in the form of a very stiff gel is prepared from the product of Example 19 using a mixture of 64 parts of methanol and 80 parts of water as the conversion agent to convert 800 parts of the overbased material. After the conversion process, the resulting disperse system is heated to about 150° C. to remove the alcohol and water.

EXAMPLE 54

5000 parts of the product of Example 20 are placed in a resin reactor equipped with a heating mantle, thermocouple, gas-inlet tube, condenser and metal stirrer, and heated to 40° C. with stirring. Carbon dioxide is bubbled through this product at the rate of one cubic foot per hour for 2.4 hours, the temperature of the whole varying from 40° C. to 44° C. 282.6 parts of isopropyl alcohol, 282.6 parts of methanol and 434.8 parts of distilled water are added over a five-minute period. The whole is heated to 78° C. and refluxed for 30 minutes. 667 parts of SC Solvent 100 are added. The reactor is equipped with a trap. Isopropyl alcohol, methanol and water are stripped from the whole by bubbling nitrogen at two cubic feet per hour through the whole over a period of five hours while maintaining the temperature at 160° C. The whole is dried to 0.05% by weight water content and then cooled to room temperature. The solids content is adjusted to 60% solids with SC Solvent 100.

EXAMPLE 55

1000 parts of the overbased material of Example 21 is converted to a colloidal disperse system by using as a conversion agent a mixture of 100 parts of methanol and 300 parts of water. The mixture is stirred for seven hours at a temperature within the range of 72°–80° C. At the conclusion of the mixing, the resulting mass is heated gradually to a temperature of about 150° C. over a three-hour period to remove all volatile liquid contained therein. Upon removal of all volatile solvents, a tan powder is obtained. By thoroughly mixing this tan powder with a suitable organic liquid such as naphtha, it is again transformed into a colloidal disperse system.

EXAMPLE 56

A mixture of 1000 parts of the product of Example 22, 100 parts of water, 80 parts of methanol, and 300 parts of naphtha are mixed and heated to 72° C. under reflux conditions for about five hours. A light brown viscous liquid material is formed which is the desired colloidal disperse system. This liquid is removed and consists of the colloidal disperse system wherein about 11.8% of the disperse medium is mineral oil and 88% is naphtha.

Following the techniques of Example 26, additional overbased materials as indicated below are converted to the corresponding colloidal disperse systems.

| Example No. | Overbased material of below examples converted to colloidal disperse system |
|---|---|
| 57 | Example 11 |
| 58 | Example 14 |
| 59 | Example 15 |
| 60 | Example 16 |
| 61 | Example 17 |
| 62 | Example 18 |
| 63 | Example 19 |
| 64 | Example 21 |

EXAMPLE 65

A mixture of 1000 parts of the overbased material of Example 23 and 388.4 parts of mineral oil is heated to 55°–60° C. and blown with carbon dioxide until the base number is about one. 56.5 parts methanol and 43.5 parts water are added and the whole is mixed at 75°–80° C. under reflux until the viscosity increases to a maximum.

The maximum viscosity can be determined by visual inspection. 472.5 parts of 97.3% calcium hydroxide and 675.4 parts of mineral oil are added and the whole is blown with carbon dioxide at a temperature of 75°–80° C. until the whole is substantially neutral. Alcohol and water are removed by blowing the whole with nitrogen at 150° C. The resulting product has a calcium content of 13.75% and a metal ratio of 36.

EXAMPLE 66

A first mixture of 57 parts methanol and 43 parts water is prepared. A second mixture is prepared by adding 220 parts N-heptane to 1000 parts of the product of Example 9. The second mixture is carbonated by blowing carbon dioxide at 49°–55° C. to reduce the direct base number to 7–15. The first mixture of methanol and water is added to the carbonated second mixture and mixed under reflux conditions at 62°–66° C. until a gel is formed. This material is then heated to 149° C. and flash-stripped of N-heptane, alcohols and water over into mineral oil. This material is further dried by nitrogen blowing at 149°–160° C. Mineral oil is added to provide a No. 1 grease penetration specification.

The change in rheological properties associated with conversion of a Newtonian overbased material into a non-Newtonian colloidal disperse system is demonstrated by the Brookfield Viscometer data derived from overbased materials and colloidal disperse systems prepared therefrom. In the following samples, the overbased material and the colloidal disperse systems are prepared according to the above-discussed and exemplified techniques. In each case, after preparation of the overbased material and the colloidal disperse system, each is blended with dioctylphthalate (DOP) so that the compositions tested in the viscometer contain 33.3% by weight DOP (Samples A, B and C) or 50% by weight DOP (Sample D). In Samples A–C, the acidic material used in preparing the overbased material is carbon dioxide while in Sample D, acetic acid is used. The samples each are identified by two numbers, (1) and (2). The first is the overbased material-DOP composition and the second the colloidal disperse system-DOP composition. The overbased materials of the samples are further characterized as follows:

Sample A

Calcium overbased petrosulfonic acid having a metal ratio of about 12.2.

Sample B

Barium overbased oleic acid having a metal ratio of about 3.5.

Sample C

Barium overbased petrosulfonic acid having a metal ratio of about 2.5.

Sample D

Calcium overbased commercial higher fatty acid mixture having a metal ratio of about 5.

The Brookfield Viscometer data for these compositions is tabulated below. The data of all samples is collected at 25° C.

| | BROOKFIELD VISCOMETER DATA (Centipoises) | | | | | | | |
|---|---|---|---|---|---|---|---|---|
| | Sample A | | Sample B | | Sample C | | Sample D | |
| R.p.m. | (1) | (2) | (1) | (2) | (1) | (2) | (1) | (2) |
| 6 | 230 | 2,620 | 80 | 15,240 | 240 | 11,320 | 114 | 8,820 |
| 12 | 235 | 2,053 | 90 | 8,530 | 230 | 6,980 | 103 | 5,220 |
| 30 | 239 | (1) | 88 | (1) | 224 | 4,008 | 100 | 2,892 |

(1)Off scale.

The Metal-Containing Organic Phosphate Complex (C)

The metal-containing organic phosphate complex (C) is prepared by the process which comprises the reaction of (C)(1) at least one polyvalent metal salt of an acid phosphate ester derived from the reaction of phosphorus pentoxide or phosphoric acid with a mixture of a monohydric alcohol and from about 0.25 to about four equivalents of a polyhydric alcohol with (C)(2) at least about 0.1 equivalent of an organic epoxide. The preparation of these phosphate complexes is described in U.S. Pat. No. 3,215,716, which is incorporated herein by reference.

The acid phosphate esters required for the preparation of starting material (C)(1) are made, as indicated, by the reaction of phosphorus pentoxide or phosphoric acid with a mixture of a monohydric alcohol and a polyhydric alcohol. The precise nature of this reaction is not entirely clear, but it is known that a mixture of phosphate esters is formed. This mixture consists principally of acid phosphate esters, i.e., compounds of the general formula:

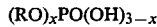

$(RO)_xPO(OH)_{3-x}$ where x equals 1 or 2 and R is an organic group, although some neutral triesters of the formula $(RO)_3PO$ may also be formed.

The nature and the stoichiometry of the reaction are complicated further by the fact that one of the reactants is a polyhydric alcohol. It is possible, therefore, that the polyhydric alcohol forms cyclic and/or polymeric phosphate esters when it reacts with phosphorous pentoxide.

The acid phosphate esters resulting from the reaction of one mole or phosphorous pentoxide with from about 2 to about 6 equivalents of a mixture of monohydric and polyhydric alcohols are useful in the preparation of starting material (C)(1). The term "equivalent" as used herein reflects the hydroxyl equivalency of the alcohol. Thus, for example, 1 mole of octyl alcohol is 1 equivalent thereof, 1 mole of ethylene glycol is 2 equivalents thereof, and 1 mole of glycerol is 3 equivalents thereof.

Less than 2 or more than 6 equivalents of alcohol can be used, if desired, in the reaction with one mole of phosphorus pentoxide, although such amounts are not preferred for reasons of economy. When fewer than 2 equivalents of alcohol are used, some unreacted phosphorus pentoxide may remain in the product or precipitate therefrom. On the other hand, when substantially more than 6 equivalents of alcohol are used, unreacted alcohol would be present in the product. It is generally preferred to employ from about 3 to about 5 equivalents of the alcohol mixture per mole of phosphorous pentoxide or phosphoric acid.

The monohydric alcohols useful in the preparation of starting material (C)(1) are principally the non-benzenoid alcohols, i.e., the aliphatic and cycloaliphatic alcohols, although in some instances aromatic and/or heterocyclic substitutents may be present. Thus, suitable monohydric alcohols include propyl, isopropyl, butyl, isobutyl, amyl, hexyl, cyclohexyl, heptyl, methylcyclohexyl, octyl, isooctyl, decyl, lauryl, tridecyl, oleyl, benzyl, beta-phenethyl, alpha-pyridylethyl, etc., alcohols. Mixtures of such alcohols can also be used if desired. Substituents such as chloro, bromo, fluoro, nitro, nitroso, ester, ether, sulfide, keto, etc., which do not prevent the desired reaction may also be present in the alcohol. In most instances, however, the monohydric alcohol will be an unsubstituted alkanol.

The polyhydric alcohols useful in the preparation of starting material (C)(1) are principally glycols, i.e., dihydric alcohols, although trihydric, tetrahydric, and higher polyhydric alcohols may also be used. In certain instances, they may contain aromatic and/or heterocyclic substituents as well as chloro, brom, fluoro, nitro, nitroso, ether, ester, sulfide, keto, etc., substituents. Thus, suitable polyhydric alcohols include ethylene glycol, diethylene glycol, triethylene glycol, propylene glycol, dipropylene glycol, 1,3-butanediol, glycerol, glycerol monooleate, mono-phenyl ether or glycerol, mono-benzyl ether of glycerol, 1,3,5-hexanetriol, pentaerythritol, sorbitol dioctanoate, pentaerythritol dioleate, and the like. In lieu of a single polyhydric alcohol, mixtures of two or more of such alcohols may be employed.

As indicated, starting material (C)(1) is prepared from a mixture of monohydric and polyhydric alcohols. The mixture may contain a single monohydric and a single polyhydric alcohol, or a plurality of one or both of such alcohols. Preferably, about 0.25 to about 4 equivalents of polyhydric alcohol per equivalent of monohydric alcohol are used. Mixtures of isooctyl alcohol and dipropylene glycol are satisfactory and a mixture in which these alcohols are present in about equivalent amounts can be used.

The reaction between the alcohol mixture and phosphorous pentoxide or phosphoric acid is exothermic and can be carried out conveniently at a temperature ranging from room temperature or below to a temperature just beneath the decomposition point of the mixture. Generally, reaction temperatures within the range of from about 40° C. to about 200° C. are most satisfactory. The reaction time required varies according to the temperature and to the hydroxyl activity of the alcohols. At the higher temperatures, as little as 5 to 10 minutes may be sufficient for complete reaction. On the other hand, at room temperature 12 or more hours may be required. Generally it is most convenient to heat the alcohol mixture with phosphorus pentoxide or phosphoric acid for 0.5 to 8 hours at 60°-120° C. In any event, the reaction is carried out until periodic acid number determinations on the reaction mass indicate that no more acid phosphate esters are being formed.

The acid phospate esters useful in the process of this invention can also be prepared by separately reacting phosphorus oxide or phosphoric acid with the monohydric and polyhydric alcohols and then mixing the esters so formed. As mentioned below, solvents may be used when the phosphate esters are viscous or otherwise difficult to handle.

To facilitate mixing and handling, the reaction may be conducted in the presence of an inert solvent. Generally such solvent is a petroleum distillate hydrocarbon, an aromatic hydrocarbon, an ether, or a lower chlorinated alkane, although mixtures of any such solvents can be used. Typical solvents include, e.g., petroleum aromatic spirits boiling in the range about 120°-200° C., benzene, xylene, toluene, mesitylene, ethylene dichloride, diisopropyl ether, etc. In most instances, the solvent is allowed to remain in the acid phospate esters and ultimately the metal-containing organic phosphate complex, where it serves as a vehicle for the convenient application of films to metal surfaces.

The conversion of the acid phosphate esters to the polyvalent metal salt may be carried out by any of the various known methods for the preparation of salts of organic acids such as, e.g., reaction of the acid-esters with a polyvalent metal base such as a metal oxide, hydroxide, or carbonate. Other suitable methods include, e.g., reaction of the acid-esters with a finely divided polyvalent metal, or the metathesis of a monovalent metal salt of the acid-esters with a soluble salt of the polyvalent metal such as, e.g., a nitrate, chloride, or acetate thereof.

The polyvalent metal of starting material (C)(1) may be any light or heavy polyvalent metal such as, e.g., zinc, cadmium, lead, iron, cobalt, nickel, barium, calcium, strontium, magnesium, copper, bismuth, tin, chromium, or manganese. A preference is expressed for the polyvalent metals of Group II of the Periodic Table and of these, zinc is particularly preferred. A preferred starting material (C)(1) is the zinc salt of the acid phosphate esters formed by the reaction of a mixture of equivalent amounts of isooctyl alcohol and dipropylene glycol with phosphorus pentoxide.

The formation of the metal-containing organic phosphate complex of component (C) involves, as indicated, a reaction between starting material (C)(1), the polyvalent metal salt of certain acid phosphate esters, and starting material (C)(2), the organic epoxide.

The organic epoxides are compounds containing at least one

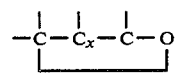

linkage where x is zero or an integer of from 1 to about 12. Examples of useful organic epoxides include the various substituted and unsubstituted alkylene oxides containing at least two aliphatic carbon atoms, such as, e.g., ethylene oxide, 1,2-propylene oxide, 1,3-propylene oxide, 1,2-butylene oxide, pentamethylene oxide, hexamethylene oxide, 1,2-octylene oxide, cyclohexene oxide, methyl cyclohexene oxide, 1,2,11,12-diepoxydodecane, styrene oxide, alpha-methyl styrene oxide, beta-propiolactone, methyl epoxycaprylate, ethyl epoxypalmitate, propyl epoxymyristate, butyl epoxystearate, epoxidized soyabean oil, and the like. Of the various available organic epoxides, it is preferred to use those which contain at least 12 carbon atoms. Especially preferred are those epoxides which contain at least 12 carbon atoms and also a carboxylic ester group in the molecule. Thus, the commercially available epoxidized carboxylic ester, butyl epoxy stearate, is a preferred starting material (C)(2) for the purpose of this invention. If desired, the organic epoxide may also contain substituents such as, e.g., chloro, bromo, fluoro, nitro, nitroso, ether, sulfide, keto, etc., in the molecule.

The stoichiometry of the reaction of the polyvalent metal salt of the acid phosphate ester with the organic epoxide, to form the metal-containing organic phosphate complex of component (C) is not precisely known. These are indications, however, that the reaction involves about one equivalent each of the polyvalent metal salt and the organic epoxide (for this reaction, one equivalent of an epoxide is the same as one mole thereof). This is not to say that complexes made from one equivalent of the polyvalent metal salt and less than or more than one equivalent of the organic epoxide are unsuited for the purpose of this invention. Complexes prepared using as little as 0.1 or 0.25 equivalent or as much as 1.5 to 2 or more equivalents of the organic epoxide per equivalent of polyvalent metal salt are satisfactory for the purpose of this invention.

The reaction between the organic epoxide and the polyvalent metal salt of the acid phospate esters is only slightly exothermic, so in order to insure complete reaction some heat is generally supplied to the reaction mass. The time and temperature for this reaction are not particularly critical; satisfactory results may be obtained by maintaining the mass for 0.5-6 hours at a temperature within the range of from about 40° C. to about 150° C. Ordinarily, the product is clear and does not require a filtration. In some instances, however, it may be desirable to filter the product, particularly when the polyvalent metal salt starting material has not been purified.

The following Examples 67-78 are illustrative of specific modes of preparing component (C). All parts and percentages are by weight unless otherwise indicated.

EXAMPLE 67

49 parts of dipropylene glycol (0.73 equivalent), 95 parts (0.73 equivalent) of isooctyl alcohol, and 133 parts of aromatic petroleum spirits boiling in the range of 158°-176° C. are added to a reaction vessel. The whole is stirred at room temperature and 60 parts (0.42 mole) of phosphorus pentoxide are added portionwise over a period of about 0.5 hour. The heat of reaction causes the temperature to rise to about 80° C. After all of the phosphorus pentoxide has been added, the whole is stirred for an additional 0.5 hour at 95° C. The resulting acid phosphate esters show an acid number of 91 with bromphenol blue as an indicator.

The mixture of acid phosphate esters is converted to the corresponding zinc salt by reacting it with 34.5 parts of zinc oxide for 2.5 hours at 95° C. Thereafter 356 parts (one equivalent per equivalent of zinc salt) of butyl epoxystearate is added to the zinc salt at 88° C. over a period of about one hour and the whole is stirred for four hours at 90° C. Filtration of the mass yields 684 parts of a zinc-containing organic phosphate complex having the following analysis: Percent phosphorus, 3.55; percent zinc, 3.78; and specific gravity, 1.009.

EXAMPLE 68

A cadmium-containing organic phosphate complex is made in the manner set forth in Example 67, except that 54.5 parts of cadmium oxide is used in lieu of the specified amount of zinc oxide.

EXAMPLE 69

A lead-containing organic phosphate complex is made in the manner set forth in Example 67, except that 95 parts of lead monoxide are used in lieu of the specified amount of zinc oxide.

EXAMPLE 70

A barium-containing organic phosphate complex is made in the manner set forth in Example 67, except that 73 parts of barium hydroxide are used in lieu of the specified amount of zinc oxide.

EXAMPLE 71

A tin-containing organic phosphate complex is made in the manner set forth in Example 67, except that 57 parts of stannic oxide are used in lieu of the specified amount of zinc oxide.

EXAMPLE 72

520 parts of isooctyl alcohol (4 equivalents), 268 parts of isopropylene glycol (4 equivalents), and 1031 parts of toluene are added to a reaction vessel. The whole is stirred and 243 parts (1.71 moles) of phosphorus pentoxide are added portionwise over a period of two hours. The exothermic character of the reaction causes the temperature to rise from room temperature to 60° C. To insure complete reaction, the whole is stirred for an additional four hours at 60° C. The resulting 50% solution of the acid phosphate esters in toluene shows an acid number of 88 with bromphenol blue as an indicator.

1000 parts of the toluene solution of acid phosphate esters of the preceding paragraph are converted to the corresponding zinc salt by reaction with 83 parts of zinc oxide for 5.5 hours at 40°-45° C. Filtration yields a clear, light-yellow toluene solution of the zinc salt. 360 parts of this toluene solution (0.34 equivalent) is heated with 25 parts (0.34 quivalent) of beta-propiolactone for 5.5 hours at 50°-60° C. to yield the desired zinc-containing organic phosphate complex as a 55% solution in toluene. It has the following analysis: 4.26% phosphorus and 5.05% zinc.

EXAMPLE 73

A toluene solution of acid phosphate esters is made in the manner set forth in Example 72.

994 parts of the indicated toluene solution of acid phosphate esters is heated with 76 parts of calcium hydroxide for five hours at 45°-60° C. Filtration yields the calcium salt of the acid phosphate esters as a 51% solution in toluene.

325 parts (0.52 equivalent) of the toluene solution of the calcium salt is heated with 220 parts (0.52 equivalent) of 85% butyl epoxystearate for five hours at 50°-60° C. to prepare the desired calcium-containing organic phosphate complex as a 71% solution in toluene. It has the following analysis: 2.34% phosphorus and 1.65% calcium.

EXAMPLE 74

A batch of acid phosphate esters is made in the manner set forth in Example 72, except that the amount of toluene solvent employed is reduced to 443 parts so as to yield a more concentrated (70%) solution of the esters in toluene.

290 parts of this toluene solution are neutralized with a mixture of 28.2 parts of zinc oxide and 11.2 parts of calcium hydroxide for three hours at 50°-70° C. Filtration of the mass yields a mixed zinc-calcium salt of the acid phosphate esters as a 73% solution in toluene.

116.2 parts of the above mixed zinc-calcium salt (0.19 equivalent) and 80.4 parts (0.19 equivalent) of 85% butyl epoxystearate are heated for six hours at 50°-60°

C. to prepare an 84% solution in toluene of a calcium and zinc-containing organic phosphate complex. It has the following analysis: 2.69% phosphorus; 0.22% calcium; and 3.13% zinc.

EXAMPLE 75

A zinc-containing organic phosphate complex is made in the manner set forth in Example 67, except for the following differences: 58 parts of 1,2-propylene oxide is used in lieu of the butyl epoxystearate and the reaction between the zinc salt of the acid phosphate esters and the 1,2-propylene oxide is carried out at 30°–35° C., rather than 88°–90° C.

EXAMPLE 76

A zinc-containing organic phosphate complex is made in the manner set forth in Example 67, except that 136 parts (0.73 equivalent) of lauryl alcohol and 39 parts (0.73 equivalent) of diethylene glycol are used in lieu of the specified amounts of isooctyl alcohol and dipropylene glycol.

EXAMPLE 77

A zinc-containing organic phosphate complex is made in the manner set forth in Example 67, except that 185 parts (1.17 equivalents) of n-decanol-1 and 7.9 parts (0.29 equivalent) of pentaerythritol are used in lieu of the specified amounts of isooctyl alcohol and dipropylene glycol.

EXAMPLE 78

A solution of 49 parts (0.73 equivalent) of dipropylene glycol, 95 parts (0.73 equivalent) of isoctyl alcohol and 133 parts of toluene is prepared, and 60 parts (0.423 mole) of phosphorus pentoxide are added over a period of about 0.5 hour at a temperature of from about 50° C. to about 90° C. After all of the phosphorus pentoxide is added, the mixture is stirred for an additional five hours at about 90° C. The resulting acid phosphate ester mixture has an acid number of 75 with bromphenol blue as an indicator.

This mixture of acid phosphate esters is converted to the corresponding zinc salt by reaction with 34.5 parts of zinc oxide for one hour at 93° C. The water and toluene is removed by heating the mixture to 160° C./100 mm. in nine hours. Thereafter, 356 parts (1 equivalent per equivalent of zinc salt) of butyl epoxystearate is added to the zinc salt over a period of one hour at about 125° C. and the mixture is then maintained for four hours at about 95° C. The mixture is filtered and the filtrate has the following analysis: 4.71% phosphorus; 4.85% zinc; and a specific gravity of 1.0515.

The Alkali and Alkaline Earth Metal Organic Acid Salts (D)

The alkali and alkaline earth metal organic acids of this invention are preferably those containing at least 12 aliphatic carbons although the acids may contain as few as 8 aliphatic carbon atoms if the acid molecule includes an aromatic ring such as phenyl, naphthyl, etc. Representative organic acids suitable for preparing these materials are discussed and identified in detail in U.S. Pat. Nos. 2,616,904 and 2,777,874, which are incorporated herein by reference. Oil-soluble carboxylic and sulfonic acids are particularly suitable. Illustrative of the carboxylic acids are palmitic acid, stearic acid, myristic acid, oleic acid, linoleic acid, behenic acid, hexatriacontanoic acid, tetrapropylene-substituted glutaric acid, polyisobutene (M.W.-5000)-substituted succinic acid, polypropylene, (M.W.-10,000)-substituted succinic acid, octadecyl-substituted adipic acid, chlorostearic acid, 9-methylstearic acid, dichlorostearic acid, stearylbenzoic acid, eicosane-substituted naphthoic acid, dilauryl-decahydro-naphthalene carboxylic acid, didodecyl-tetralin carboxylic acid, dioctylcyclohexane carboxylic acid, mixtures of these acids, their alkali and alkaline earth metal salts, and/or their anhydrides. Of the oil-soluble sulfonic acids, the mono-, di-, and trialiphatic hydrocarbon substituted aryl sulfonic acids and the petroleum sulfonic acids (petrosulfonic acids) are particularly preferred. Illustrative examples of suitable sulfonic acids include mahogany sulfonic acids, petrolatum sulfonic acids, monoeicosane-substituted naphthalene sulfonic acids dodecylbenzene sulfonic acids, didodecylbenzene sulfonic acids, dinonylbenzene sulfonic acids, cetylchlorobenzene sulfonic acids, dilauryl beta-naphthalene sulfonic acids, the sulfonic acid derived by the treatment of polyisobutene having a molecular weight of 1500 with chlorosulfonic acid, nitronaphthalenesulfonic acid, paraffin wax sulfonic acid, cetylcyclopentane sulfonic acid, lauryl-cyclohexanesulfonic acids, polyethylene (M.W.-750) sulfonic acids, etc. Normally the aliphatic groups will be alkyl and/or alkenyl groups such that the total number of aliphatic carbons is at least 12.

Within this preferred group of overbased carboxylic and sulfonic acids, the barium and calcium over based mono-, di-, and trialkylated benzene and naphthalene (including hydrogenated forms thereof), petrosulfonic acids, and higher fatty acids are especially preferred. Illustrative of the synthetically produced alkylated benzene and naphthalene sulfonic acids are those containing alkyl substituents having from 8 to about 30 carbon atoms therein. Such acids include di-isododecyl-benzene sulfonic acid, wax-substituted phenol sulfonic acid, wax substituted benzene sulfonic acids, polybutene-substituted sulfonic acid, cetylchlorobenzene sulfonic acid, di-cetylnaphthalene sulfonic acid, di-lauryldiphenylether sulfonic acid, di-isononylbenzene sulfonic acid, di-isooctadecylbenzene sulfonic acid, stearylnaphthalene sulfonic acid, and the like. The petroleum sulfonic acids are particularly preferred. Petroleum sulfonic acids are obtained by treating refined or semi-refined petroleum oils with concentrated or fuming sulfuric acid. These acids remain in the oil after the settling out of sludges. These petroleum sulfonic acids, depending on the nature of the petroleum oils from which they are prepared, are oil-soluble alkane sulfonic acid, alkyl-substituted cycloaliphatic sulfonic acids including cycloalkyl sulfonic acids and cycloalkene sulfonic acids, and alkyl, alkaryl, or aralkyl substituted hydrocarbon aromatic sulfonic acids including single and condensed aromatic nuclei as well as partially hydrogenated forms thereof. Examples of such petrosulfonic acids include mahogany sulfonic acid, white oil sulfonic acid, petrolatum sulfonic acid, petroleum naphthene sulfonic acid, etc. This especially preferred group of aliphatic fatty acids includes the saturated and unsaturated higher fatty acids containing from 12 to 30 carbon atoms. Illustrative of these acids are lauric acid, palmitic acid, oleic acid, linoleic acid, linolenic acid, oleostearic acid, stearic acid, myristic acid, and undecalinic acid, alpha-chlorostearic acid, and alpha-nitrolauric acid.

The metal base can be an alkali or alkaline earth metal (e.g., sodium, potassium, calcium, barium, etc.) oxide, hydroxide, bicarbonate, sulfide, mercaptide, hydride, alcoholate or phenate. The acid salts are formed by mixing the metal base with the organic acid using mixing procedures well known in the art.

The Carboxylic Acid (E)

The carboxylic acids of the present invention are one or more mono- or polycarboxylic acids of one to about 20 carbon atoms such as fatty acids having 10 to about 18 carbon atoms.

Typical monocarboxylic acids include saturated and unsaturated fatty acids, such as lauric acid, stearic acid, oleic acid, myristic acid, linoleic acid, and the like. Anhydrides, when available, and lower alkyl esters of these acids can also be used. Mixtures of two or more such acids can also be used. An extensive discussion of such acids is found in Kirk-Othmer "Encyclopedia of Chemical Technology" 2nd Edition, 1965, John Wiley & Sons, N.Y., pages 811–856. Acetic acid, propionic acid, butyric acid, acrylic and benzoic acid as well as their anhydrides and lower alkyl esters are also useful.

Among the useful polycarboxylic acids are maleic acid, fumaric acid, itaconic acid, mesaconic acid, succinic acid, phthalic acid, alkyl-substituted phthalic acids, isophthalic acid, malonic acid, glutaric acid, adipic acid, citraconic acid, glutaconic acid, chloromaleic acid, ataconic acid, scorbic acid, etc. Again anhydrides when available, and lower alkyl esters and esters of these acids can be used.

Certain lower molecular weight substituted succinic acids and anhydrides can also be used. A number of these are discussed in the above-cited Kirk-Othmer article at pages 847–849. The typical such acylating agents can be represented by the formula:

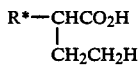

wherein R* is a $C_1$ to about a $C_{10}$ hydrocarbyl group. Preferably, R* is an aliphatic or alicyclic hydrocarbyl group with less than 10% of its carbon-to-carbon bonds being unsaturated. Examples of such groups are 4-butylcyclohexyl, di(isobutyl), decyl, etc. The production of such substituted succinic acids and their derivatives via alkylation of maleic acid or its derivatives with a halohydrocarbon is well known to those of skill in the art and need not be discussed in detail at this point.

The N-(Hydroxyl-Substituted Hydrocarbyl)Amines (F)

The N-(hydroxyl-substituted hydrocarbyl) amines (F) of the present invention generally have one to about four, typically one to about two hydroxyl groups per molecule. These hydroxyl groups are each bonded to a hydrocarbyl group to form a hydroxyl-substituted hydrocarbly group which, in turn, is bonded to the amine portion of the molecule. These N-(hydroxyl-substituted hydrocarbyl) amines can be monamines or polyamines and they can have a total of up to about 40 carbon atoms; generally they have a total of about 20 carbon atoms. Typically, however, they are monoamines containing but a single hydroxyl group. These amines can be primary, secondary or tertiary amines while the N-(hydroxyl-substituted hydrocarbyl) polyamines can have one or more of any of these types of amino groups. Mixtures of two or more of any of the afore-described amines can also be used to make the component (F) of the invention.

Specific examples N-(hydroxyl-substituted hydrocarbyl) amines suitable for use in this invention are the N-(hydroxy-lower alkyl) amines and polyamines such as 2-hydroxyethylamine, 3-hydroxybutylamine, di-(2-hydroxyethyl)amine, tri-(2-hydroxyethyl)amine, di-(2-hydroxypropyl)amine, N,N,N'-tri-(2-hydroxyethyl) ethylenediamine, N,N,N,',N'-tetra(2-hydroxyethyl)ethylenediamine, N-(2-hydroxyethyl)piperazine, N,N'-di-(3-hydroxypropyl)piperazine, N-(2-hydroxyethyl)-morpholine, N-(2-hydroxyethyl)-2-morpholinone, N-(2-hydroxyethyl)-3methyl-2-morpholinone, N-(2-hydroxypropyl)-6-methyl-2-morpholinone, N-(2-hydroxypropyl)-5carbethoxy-2-piperidone, N-(2-hydroxypropyl)-5-carbethoxy-2-piperidone, N-(2-hydroxyethyl)-5-(N-butylcarbamyl)-2-piperidone, N-(2-hydroxyethyl)piperidine, N-(4-hydroxybutyl)piperidine, N,N-di-(2-hydroxyethyl)glycine, and ethers thereof with aliphatic alcohols, especially lower alkanols, N,N-di(3-hydroxypropyl)glycine, and the like.

Further amino alcohols are the hydroxy-substituted primary amines described in U.S. Pat. No. 3,576,743 (which is incorporatad herein by reference) by the formula $$R_a—NH_2$$

where $R_a$ is a monovalent organic radical containing at least one alcoholic hydroxy group. According to this patent, the total number of carbon atoms in $R_a$ will not exceed about 20. Hydroxy-substituted aliphatic primary amines containing a total of up to about 10 carbon atoms are useful. Generally useful are the polyhydroxy-substituted alkanol primary amines wherein there is only one amino group present (i.e., a primary amino group) having one alkyl substituent containing up to 10 carbon atoms and up to ∝hydroxyl groups. These alkanol primary amines correspond to $R_aNH_2$ wherein $R_a$ is a mono- or polyhydroxy-substituted alkyl group. It is typical that at least one of the hydroxyl groups be a primary alcoholic hydroxyl group. Tris-methylolaminomethane is a typical hydroxy-substituted primary amine. Specific examples of the hydroxy-substituted primary amines include 2-amino-1-butanol, 2-amino-2-methyl-1-propanol, p-(betahydroxyethyl)-analine, 2-amino-1-propanol, 3-amino-1-propanol, 2-amino-2-methyl-1,3-propanediol, 2-amino-2-ethyl-1,3-propanediol, N-(betahydroxy-propyl)-N'-beta-aminoethyl)piperazine, 2-amino-1-butanol, ethanolamine, beta-(betahydroxy ethoxy)-ethyl amine, glucamine, glusoamine, 4-amino-3-hydroxy-3-mehtyl-1-butene (which can be prepared according to procedures known in the art by reacting isopreneoxide with ammonia), N-3-(aminopropyl)-4(2-hydroxyethyl)piperadine, 2-amino-6methyl-6-heptanol, 5-amino-1-pentanol, N-(beta-hydroxyethyl)-1,3-diamino propane, 1,3-diamino-2-hydroxypropane, N-(beta-hydroxyethoxyethyl)-ethylenediamine, and the like.

Typically, the amine (F) is a primary, secondary or tertiary alkanol amine or mixture thereof. Such amines can be represented, respectively, by the formulae:

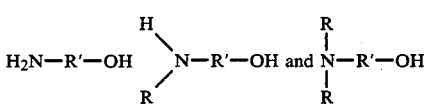

wherein each R is independently a hydrocarbyl group of 1 to about 8 carbon atoms or hydroxyl-substituted hydrocarbyl group of 2 to about 8 carbon atoms and R' is a divalent hydrocarbyl group of about 2 to about 18 carbon atoms. The group —R'—OH in such formulae represents the hydroxyl-substituted hydrocarbyl group. R' can be an acyclic, alicyclic or aromatic group. Typically, it is an acyclic straight or branched alkylene group such as an ethylene, 1,2-propylene, 1,2-butylene, 1,2-octadecylene, etc. group. Where two R groups are present in the same molecule they can be joined by a direct carbon-to-carbon bond or through a heteroatom (e.g., oxygen, nitrogen or sulfur) to form a 5-, 6-, 7- or 8-membered ring structure. Examples of such heterocyclic amines include N-(hydroxyl lower alkyl)-morpholines, -thiomorpholines, -piperidines, -oxazolidines, -thiazolidines and the like. Typically, however, each R is a lower alkyl group of up to 7 carbon atoms.

The amine (F) can also be selected from the alkylene oxide condensates (i.e., alkoxylates) with active hydrogen compounds such as alcohols, phenols, amides and amines. The amides are often fatty acid amides such as oleyl amides. A particularly useful class are the ethoxylated amines wherein the amine has at least 12 carbon atoms. Such amines can be represented by the general formulae:

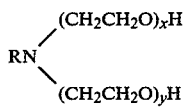

and

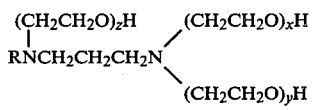

wherein R is an aliphatic hydrocarbyl group with at least about 12 carbon atoms, x, y and z are integers of zero to 40 and the sum of x+y is between 2 and 50. Usually the aliphatic group R has a maximum of about 22 carbons. Often such R groups are fatty alkyl or alkenyl groups such as coco ($C_{12}$), stearyl ($C_{18}$), tallow ($C_{18}$), oleyl ($C_{18}$), and the like. Typically R is a tallow residue and the sum x+y is about 5. Homologous alkoxylated amines wherein the ethoxyl residue (—$CH_2CH_2O$—) is replaced, at least in part, by a propoxyl residue

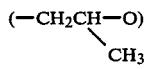

are also useful.

Mixtures of one or more of the afore-described amines can be used.

The compositions of the present invention contain an effective amount of water to provide a stable dispersion or emulsion (water-in-oil or oil-in-water) of the components of the compositions of the invention. Generally, the compositions of the invention have about 5% to about 99% preferably about 25% to about 75% by weight water. These compositions generally contain from about 5% to about 70% by weight, preferably about 40% to about 60%, and advantageously about 50% to about 55% by weight of component (B). The weight ratio of component (B) to component (C) is generally from about 0.25:1 to about 10:1, preferably about 1:1 to about 5:1. These compositions generally contain from about 15% to about 75% by weight, preferably about 15% to about 30% by weight of component (D). The level of component (E) is generally in the range of about 0.5% to about 10% by weight, preferably about 1% to about 5%, and advantageously about 2% to about 4%. The level of addition of component (F) is dependent upon the level of addition of component (E). It is preferable to provide a stoichiometric excess of component (F) over component (E) so as to neutralize component (E) and provide the compositions of the present invention with a slightly alkaline character. Generally these compositions have a pH ranging from slightly alkaline to about 10, preferably from about 8 to about 9.

The compositions of the present invention include aqueous concentrates which contain an effective amount of water to reduce the viscosity of such compositions to facilitate shipping and handling. Generally, these aqueous concentrates contain at least about 25% by weight water, preferably about 25% to about 75% water, and advantageously about 60% to about 75% water. The aqueous concentrates of the invention can often be used as such without additional water depending upon the desired end use. Alternatively, these concentrates can be further diluted by the addition of water using standard mixing techniques if desired.

Generally, the corrosion-inhibiting coating compositions of the present invention contain about 60% to about 90%, preferably about 70% to about 80% by weight water.

On the other hand, the compositions intended for use as metal-working fluids require additional levels of water. These metal-working fluids generally require about 80% to about 99%, preferably about 90% to about 97% by weight water.

As indicated above, the compositions of the invention also include aqueous drilling fluids. These drilling fluids contain a major amount of an aqueous drilling mud and a minor torque reducing amount of components (B) and (C). Preferably these drilling fluids also contain an effective amount of components (D), (E) and (F) to disperse components (B) and (C) in the drilling mud. The relative ratios of components (B), (C), (D), (E) and (F) are within the ratios set forth above. The drilling fluids of the invention generally contain about 90% to about 99.5% by weight of an aqueous drilling mud. Components (B), (C), (D), (E) and (F) can be added directly to the drilling mud or they may be first formulated as an aqueous concentrate, as discussed above and then added to the drilling mud. It is preferable to formulate these compositions in the form of an aqueous concentrate of the type discussed above for purposes of facilitating shipping and handling prior to addition to the drilling mud.

The drilling fluids of the present invention can also contain other materials which are known to be used in such applications, such as clay thickeners, density-increasing agents such as barites, rust-inhibiting and corrosion-inhibiting agents, surfactants and acid or basic reagents to adjust the pH of the drilling fluid. A typical drilling fluid within the scope of the present invention is made from a 5% by weight bentonite clay slurry using well known techniques.

EXAMPLE 79

240 parts of oleic acid and 160 parts of triethanolamine are mixed for two minutes at room temperature.

1600 parts of sodium petroleum sulfonate dispersed in oil (61% by weight sodium petroleum sulfonate) and 1600 parts of the product of Example 67 are added and the whole is stirred for five minutes at room temperature. 4400 parts of the product of Example 66 are added to the whole over a period of one-half hour while heating to 65° C. The temperature of the whole is maintained at 65° C. for an additional one-half hour. The whole is cooled to 49° C. while mixing over a period of one-half hour and then cooled to room temperature to provide the desired product which is in the form of a pourable soft gel.

EXAMPLE 80

The product of Example 79 is dispersed with water at a temperature of 60° C. to form a series of stable emulsions as indicated in Table I below.

TABLE I

| Product of Example 79 (Wt. %) | Water (Wt. %) | Type of Emulsion | pH |
|---|---|---|---|
| 5 | 95 | o/w* | 8.16 |
| 10 | 90 | o/w | 8.0 |
| 15 | 85 | o/w | 8.02 |
| 20 | 80 | o/w | 8.22 |
| 25 | 75 | o/w | 8.0 |
| 30 | 70 | o/w | 8.12 |
| 40 | 60 | Borderine | 8.34 |
| 50 | 50 | w/o** | 7.24 |
| 75 | 25 | w/o | 7.33 |

*o/w is an abbreviation for oil-in-water.
**w/o is an abbreviation for water-in-oil.

EXAMPLE 81

240 parts of oleic acid and 160 parts of dimethyl ethanol amine are mixed for about two minutes at room temperature. 800 parts of the sodium petroleum sulfonate identified in Example 79 and 800 parts of the product of Example 67 ae added and the whole is stirred for about five minutes at room temperature. 2000 parts of the product of Example 66 are added to the whole over a period of about one-half hour while heating to about 65° C. The temperature of the whole is maintained at 65° C. for an additional one-half hour. The whole is cooled to about 49° C. while mixing over a period of one-half hour, and then cooled to room temperature to provide the desired product.

EXAMPLE 82

The product of Example 81 is mixed with water having a temperature of 2°-5° C. to provide stable emulsions at levels of 60%, 65%, 70%, 75%, 80%, 90% and 95% by weight water.

EXAMPLE 83

240 parts of oleic acid and 160 parts of dimethyl ethanol amine are mixed for about two minutes at room temperature. 1200 parts of the sodium petroleum sulfonate identified in Example 79 and 1200 parts of the product of Example 67 are added, and the whole is stirred for about five minutes at room temperature. 1200 parts of the product of Example 66 are added to the whole over a period of about one-half hour while heating to about 65° C. The temperature of the whole is maintained at 65° C. for an additional one-half hour. The whole is cooled to about 49° C. while mixing, and then cooled to room temperature to provide the desired product.

EXAMPLE 84

Stable emulsions are provided by mixing appropriate amounts of the product of Example 82 with water having a temperature of about 2°-5° C. to provide emulsions containing 60%, 65%, 70%, 75%, 80%, 90% and 95% by weight water.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

I claim:

1. A drilling fluid comprising
   (A) a major amount of a suspension of clay in water, and
   a minor torque reducing amount of a mixture of:
   (B) an overbased non-Newtonian colloidal disperse system comprising (B)(1) solid metal-containing colloidal particles predispersed in (B)(2) a dispersing medium of at least one inert organic liquid and (B)(3) at least one member selected from the class consisting of organic compounds which are substantially soluble in said dispersing medium, the molecules of said organic compound being characterized by polar substituents and hydrophobic portions; and
   (C) a metal-containing organic phosphate complex derived from the reaction of (C)(1) at least one polyvalent metal salt of an acid phosphate ester, said acid phosphate ester being derived from the reaction of phosphorus pentoxide or phosphoric acid with a mixture of a monohydric alcohol and a polyhydric alcohol, with (C)(2) at least one organic epoxide.

2. The drilling fluid of claim 1 wherein said solid metal-containing colloidal particles (B)(1) are characterize by an average unit particle size of about 20 A. to about 5000 A.

3. The drilling fluid of claim 1 wherein said dispersing medium (B)(2) is a combination of mineral oil and at least one other organic liquid miscible with said mineral oil.

4. The drilling fluid of claim 1 wherein said solid-metal containing particles (B)(1) are selected from the group consisting of alkali and alkaline earth metal salts.

5. The drilling fluid of claim 1 wherein (B)(3) comprises at least one member selected from the group consisting of alkali and alkaline earth metal salts of oil-soluble organic acids.

6. The drilling fluid of claim 1 wherein the solid metal-containing collodal particles (B)(1) are selected from the group consisting of alkaline earth metal acetates, formates, carbonates, hydrogen carbonates, hydrogen sulfides, sulfites, hydrogen sulfites, and chlorides.

7. The drilling fluid of claim 1 wherein the ratio of monohydric and polyhydric alcohols to phosphorus pentoxide or phosphoric acid in derivation of said acid phosphate ester is about 2 to about 6 moles of said monohydric and polyhydric alcohols per mole of said phosphorus pentoxide or phosphoric acid.

8. The drilling fluid of claim 1 wherein the ratio of polyhydric alcohols to monohydric alcohols in the derivation of said acid phosphate ester is about 0.25 to about 4 equivalents polyhydric alcohol per equivalent of monohydric alcohol.

9. The drilling fluid of claim 1 wherein the metal of said polyvalent metal salt (C)(1) is selected from the group consisting of zinc, cadmium, lead, iron, cobalt, nickel, barium, calcium, strontium, magnesium, copper, bismuth, tin, chromium and manganese.

10. The drilling fluid of claim 1 wherein said organic epoxide (C)(2) contains at least one linkage of the formula

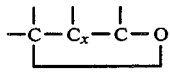

wherein x is zero or an integer of from 1 to about 12.

11. The drilling fluid of claim 1 wherein the ratio of components (C)(1) to (C)(2) is in the range of about 0.1 to about 2 equivalents of (C)(2) per equivalent of (C)(1).

12. The drilling fluid of claim 1 wherein the weight ratio of component (B) to component (C) is from about 0.25:1 to about 10:1.

13. The drilling fluid of claim 1 with an effective amount of (D) an alkali or alkaline earth metal salt of an organic acid to enhance the dispersion of components (B) and (C) in said suspension of clay in water.

14. The drilling fluid of claim 1 with an effective amount of (E) a carboxylic acid to enhance the dispersion of components (B) and (C) in said suspension of clay in water.

15. The drilling fluid of claim 1 with an effective amount of (F) an N-(hydroxyl-substituted hydrocarbyl) amine to enhance the dispersion of components (B) and (C) in said suspension of clay in water.

16. The drilling fluid of claim 1 with an effective amount of (D) an alkali or alkaline earth metal salt of an organic acid, (E) a carboxylic acid and (F) an N-(hydroxyl-substituted hydrocarbyl) amine to disperse components (B) and (C) in said suspension of clay in water.

17. The drilling fluid of claim 1 with an effective amount of a sodium petroleum sulfonate, oleic acid and triethanol amine to disperse components (B) and (C) in said suspension of clay in water.

18. A method of drilling a well comprising circulating the composition of claim 1 in said well during drilling.

* * * * *